United States Patent
Brouwer et al.

(10) Patent No.: US 7,877,460 B1
(45) Date of Patent: Jan. 25, 2011

(54) METHODS AND SYSTEMS FOR FACILITATING THE DISTRIBUTION, SHARING, AND COMMENTARY OF ELECTRONICALLY PUBLISHED MATERIALS

(75) Inventors: Robert Brouwer, Berlin (DE); Ahmed Abdulwahab, Berlin (DE)

(73) Assignee: Sequoia International Limited, Luzern (CH)

( * ) Notice: Subject to any disclaimer, the term of this patent is extended or adjusted under 35 U.S.C. 154(b) by 492 days.

(21) Appl. No.: 11/521,053

(22) Filed: Sep. 14, 2006

Related U.S. Application Data

(60) Provisional application No. 60/718,283, filed on Sep. 16, 2005.

(51) Int. Cl.
*G06F 15/16* (2006.01)

(52) U.S. Cl. .................. 709/217; 709/205; 715/511; 707/102

(58) Field of Classification Search .............. 709/217, 709/205; 715/511; 707/102
See application file for complete search history.

(56) References Cited

U.S. PATENT DOCUMENTS

| | | | | |
|---|---|---|---|---|
| 5,008,853 | A * | 4/1991 | Bly et al. | 715/751 |
| 5,781,732 | A * | 7/1998 | Adams | 709/205 |
| 6,411,989 | B1 * | 6/2002 | Anupam et al. | 709/204 |
| 7,062,532 | B1 * | 6/2006 | Sweat et al. | 709/205 |
| 7,148,905 | B2 * | 12/2006 | Hong et al. | 345/629 |
| 7,779,347 | B2 | 8/2010 | Christiansen et al. | |
| 2002/0035697 | A1 | 3/2002 | Mccurdy | |
| 2002/0059342 | A1 * | 5/2002 | Gupta et al. | 707/512 |
| 2002/0062312 | A1 | 5/2002 | Gupta et al. | |
| 2002/0178015 | A1 | 11/2002 | Zee | |
| 2003/0023679 | A1 * | 1/2003 | Johnson et al. | 709/204 |
| 2003/0182375 | A1 * | 9/2003 | Zhu et al. | 709/205 |
| 2003/0182578 | A1 | 9/2003 | Warnock et al. | |
| 2003/0208534 | A1 * | 11/2003 | Carmichael | 709/203 |
| 2004/0088647 | A1 * | 5/2004 | Miller et al. | 715/500 |
| 2004/0122843 | A1 * | 6/2004 | Terris et al. | 707/102 |
| 2004/0122898 | A1 * | 6/2004 | Srinivasa | 709/205 |
| 2004/0143630 | A1 * | 7/2004 | Kaufmann et al. | 709/205 |
| 2004/0148274 | A1 | 7/2004 | Warnock et al. | |
| 2004/0199875 | A1 | 10/2004 | Samson | |
| 2004/0205653 | A1 * | 10/2004 | Hadfield et al. | 715/530 |
| 2005/0033813 | A1 * | 2/2005 | Bhogal et al. | 709/206 |
| 2005/0044145 | A1 * | 2/2005 | Quinn et al. | 709/205 |
| 2005/0071780 | A1 | 3/2005 | Muller et al. | |
| 2005/0134606 | A1 | 6/2005 | Hong | |
| 2005/0151742 | A1 | 7/2005 | Hong | |
| 2005/0210393 | A1 * | 9/2005 | Maeng | 715/751 |
| 2006/0026502 | A1 * | 2/2006 | Dutta | 715/511 |
| 2006/0064434 | A1 * | 3/2006 | Gilbert et al. | 707/104.1 |
| 2006/0133664 | A1 | 6/2006 | Hong | |
| 2006/0136813 | A1 | 6/2006 | Hong | |

OTHER PUBLICATIONS

"NetOp School 2.5 User's Manual." No. of Pages: 272; Pub. Date: 2001.*

M Bojan et al. "Educational WEB Collaboration System." No. of Pages: 5; Pub. Date: Jun. 2004.*

* cited by examiner

*Primary Examiner*—Aaron Strange
*Assistant Examiner*—James Q Forman
(74) *Attorney, Agent, or Firm*—Goodwin Procter LLP

(57) ABSTRACT

The present invention shows methods and systems for facilitating the distribution, sharing and commentary of electronically published materials such as educational textbooks. The system incorporates a common system for receiving and publishing the documents. Features of the system including layering, iconic mark-up, user notes and comments, user communication and documents/action sharing.

18 Claims, 26 Drawing Sheets

METHODS AND SYSTEMS FOR FACILITATING THE DISTRIBUTION, SHARING, AND COMMENTARY OF ELECTRONICALLY PUBLISHED MATERIALS

RELATED APPLICATIONS

The present invention claims the benefit of U.S. provisional patent application Ser. No. 60/718,283 filed Sep. 16, 2005.

FIELD OF THE INVENTION

The present invention relates generally to the field of information management, and more particularly to methods and systems for facilitating sharing, study and markup of published materials.

BACKGROUND OF THE INVENTION

Much content which has traditionally been shared through printing and distribution, for example text, drawings, photographs, charts, etc., is today being made available in electronic format in the form of what is typically referred to as electronic books, or e-books. In fact, today's learning environment generally offers three types of content in most educational courses: traditional textbooks produced by publishers, customized content developed by professors and content developed and/or found by the students. The traditional "static," or printed paper textbooks generally contribute about 30-40% of the content of a course and serve to provide material containing the core concepts and principles of the course. Customized content developed by professors (such as syllabuses, projects, assignments and discussion reviews) accounts for about another 30% of course content. Finally, the "interactive and spontaneous content" found or developed by the students (such as content created by individuals and teams for projects and other assignments), accounts for the remaining 20-30%. This student-sourced content may, for example, be content generated through working out solutions to problems/cases or completion of assignments. Such student-sourced content is generally stimulating and is believed to generate a lasting, more-permanent knowledge growth within individual students than is third-party content. The present inventors believe that student-sourced or user-sourced content can be leveraged to improve the two other types of content generation.

Professors and students, however, are constantly struggling to successfully integrate and customize all three content types into a single dynamic learning content workflow platform/solution that would adapt to each users' (e.g. students) unique individual knowledge base, learning process, learning pace and learning format (such as reading text, listening to audio or video).

Current offerings from textbook publishers are mainly book-based and static. This forces students to source chapter-based, dynamic, supplementary content of their own accord. In contrast to the static materials, teaching in universities and schools, is chapter-based and not book-based. Unlike the "older days" where students just read printed textbooks, students today are used to finding information and doing homework online and they want to integrate their findings into their course materials. A key problem recognized by professors teaching with current textbooks is that such textbooks are very static, in comparison to teaching and student work, which is very much dynamic. Recent advances or findings cannot quickly be incorporated in a revision cycle of standard printed textbooks that typically spans several years.

Moreover, the combination of printed textbook, professor-contributed and student-sourced offerings have very limited combining and sharing possibilities. Professors and students are having a hard time sharing their own developed or sourced content on secure and convenient platforms.

Professors and students often use real-time communication functionalities such as AOL Messenger®, Yahoo Messenger®, Skype® etc. for formal, and sometimes informal communications. These existing communication channels, however, are of limited use in enhancing extrinsic study materials.

Several companies have addressed the challenge of enabling users to interact with the electronic content. Two companies in this field are Ebrary™ and SafariU™.

Considering first Ebrary™, the company is an e-book technology and services company dedicated to serving the library and publishing community. Funded by Random House Ventures LLC, Pearson plc and The McGraw-Hill Companies, Ebrary™ included content provided by more than 180 publishers. It offers to its customers full text, digital books and other authoritative content. Ebrary™ products are delivered via a proprietary dynamic content platform. To access the content, users need to download a special Ebrary™ reader for reading, viewing and taking notes. The Ebrary™ system provides an InfoTools™ function to support contextual linking. However, the features have been developed for the benefit of publishers and libraries; and not for end-users such as professors and students. Ebrary™ only has a few dynamic, interactive features and it stops short of offering the features believed by the present inventors to be required to solve the problems described above.

SafariU™, which was developed by O'Reilly Media, is an XML-driven web-based platform which enables professors to build customized print books and online syllabi, while creating an environment for the exchange of teaching materials. While SafariU™ is considered by many to be a forward-thinking solution in the area of dynamic electronic content, as it incorporates some of the key needs of professors, it still has some serious drawbacks. These problems arise from the fundamental concern of the present inventors that the platform is not end-user driven. SafariU™ is not believed to offer any real-time communication and appears to miss the importance of in-classroom discussions between professors and students. The content platform is, to the best knowledge of the present inventors, not dynamic and not customizable for students. Once professors create content, students have no option of or tools for adapting it to their specific needs. Finally, the web interface is believed by the present inventors to be awkward and difficult to understand.

U.S. Pat. No. 6,988,138 to Alcorn et al. shows an Internet-based education support system and method, whereby elements of an electronic school and classroom are provided online, including the provision of electronic textbooks. The invention appears to lack any significant functionality around the use of content materials. U.S. published patent application 20060095502 to Lewis et al. shows systems and methods for sharing content and facilitating real-time communications between parties using the content. As with the Alcorn et al. reference, the present inventors believe that the Lewis et al. reference falls short of providing the functionality necessary to enable users to fully realize an interactive, community experience relating to shared content.

The present inventors have determined that what is needed is a solution that informs all users of the specific section locations of any person reading the available content in the same class or user group, in combination with tools that make interactive mark-up and communications within text content possible for the first time. The present inventors have thus recognized a need in the art to facilitate the sharing, study and commentary of electronically published materials in a consistent and repeatable user-friendly manner.

SUMMARY OF THE INVENTION

There are provided by the present invention various methods and systems for publishing, searching, purchasing, reading, organizing and working with and/or studying digital content that includes user interaction and communication.

In accordance with one embodiment of the invention, there are provided methods and systems for managing electronic content, one such method including:

receiving electronic content;

identifying a plurality of users;

enabling each of the plurality of users to view the electronic content; and displaying to each of the plurality of users a location of each of the plurality of other viewers actively viewing the electronic content;

whereby each user can interactively view the position of other users actively viewing the electronic content.

In accordance with another embodiment of the invention, there are provided methods and systems for managing electronic content, one such method including:

receiving electronic content;

identifying a plurality of users;

authorizing each of the plurality of users to view the electronic content;

authorizing each of the plurality of users to add mark-ups to the electronic content;

authorizing each of the plurality of users to view the mark-ups in the electronic content; and authorizing each of the plurality of users to view a location of each of the plurality of other viewers actively viewing the electronic content;

whereby the plurality of users can interactively work with the electronic content.

In accordance with another embodiment of the invention, there are provided methods and systems for dynamically sharing published electronic content amongst a plurality of users, one such system comprising:

means for identifying a main, a second and a third group of electronic contents;

means for authorizing a plurality of users to access the main group of electronic content;

means for authorizing at least a first group of the plurality of users to access the main group of electronic content and the second group of electronic content; and means for authorizing at least a second group of the plurality of users to access the main group of electronic content and the third group of electronic content;

whereby a plurality of virtual electronic layers of supplemental viewable content are created in association with the main group of electronic content.

In accordance with another embodiment of the invention, there are provided methods and systems for managing electronic content, one such method including:

receiving electronic content;

identifying a plurality of users;

authorizing each of the plurality of users to view the electronic content;

authorizing each of the users to add mark-up to the electronic content; and authorizing each of the plurality of users to view the mark-up in the electronic content; and whereby the plurality of users can interactively work with the electronic content.

The methods and systems of the present invention, also referred to herein as INETOO for Internet Education Tool, go beyond just being an Internet based e-publishing or content distribution system. Based on a completely new concept, the present invention enables users, particularly those who are involved in education and publishing, to be more focused, efficient, and effective in working with, reading, studying and otherwise' using electronic books, documents and content. The system offers an integrated solution not only for buying and selling e-books but also for reading and learning. Authors and publishers can import existing book or document files and add or embed additional digital content such as videos or audio files, texts or whole documents, html links, etc., into the original content by using specific icons and creating one or more "invisible" "layers" for each respective user/user groups, making the added, embedded content available to end users on demand. The present invention is believed by the present inventors to be the first to provide these useful features and advantages.

Because the content remains on the server system, potential misuse and concerns regarding digital rights management is readily controllable. An integral part of the system is a user action broadcasting capability that allows real-time user-interaction with other users who are or have been reading the same content. In addition a dynamic note-taking functionality gives users an efficient learning experience. The dynamic note-taking capability allows users to easily generate notes from dynamically linked source material, to attach notes to any location in the source text, to set reference links between several independent documents and to allow sharing of notes across the platform members of the same group. As will be seen from a consideration of the description below, these functions provide significant advantages to the users, vastly enhancing the content study process.

DESCRIPTION OF THE DRAWING FIGURES

These and other objects, features and advantages of the present invention will now be apparent to the reader through consideration of the following drawing Figures in combination with the Detailed Description of The Invention.

DETAILED DESCRIPTION OF THE INVENTION

Overview of the Invention

The present invention provides methods and systems offering a complete solution not only for reviewing, browsing, previewing, and/or purchasing content (such as books, documents, etc.) but also for working, reading and/or studying such content. The described method and system is an Internet based service that is accessible through a client or a web-browser(s) and enables users to be focused, efficient, and effective when reading and/or working with content.

Content (such as books and documents) in substantially any electronic format (such as PDF, Doc, etc.) which may already exist, is converted to an XML format, for example conventional XML or an XML variant as described below, for use with the present invention. Authorized content owners (such as authors and publishers) can use the system for selling and distributing content such as documents and books. Through a registration process authorized content owners are able to set, for example, the prices and authorize certain features (such as custom publishing, copy pasting and printing rights, etc.) before offering the content for sharing or sale to other users.

Authorized users can import content into the software client. A virtual, electronic "layer" structure is added to the content, using authorizations and permissions as described below, and additional content (such as videos or audio files, texts, charts, photographs or whole documents etc.) can be embedded/added, making the content available to end users on demand. Technically, the system creates a new authorization level for each user/user groups—which is equivalent to the so-called "layers"—where the additional content can be embedded into the original content using specific icons. User/user groups can access the content through a software client using functionality and features provided on the server. The user client or other appropriate user interface can be downloaded by the user or otherwise authorized for access by a system manager after registering of the user by the operator of the system. Authorizations and/or restrictions are managed from the server side. Based on their entitlement and authorization, specific users or user groups are able to access certain features or content depending on their 'layer' access rights.

As used herein, examples and illustrations are exemplary and not limiting.

As used herein, the terms "layer," "layers" and variants thereof and references thereto, refer to associated, grouped content which may be visible or hidden from view depending on the access rights of a particular user or group of users. These layers are defined by respective authorization/permission rights and are independent of the client or server-side storage method or the physical storage location of the content.

System

Figure 1:
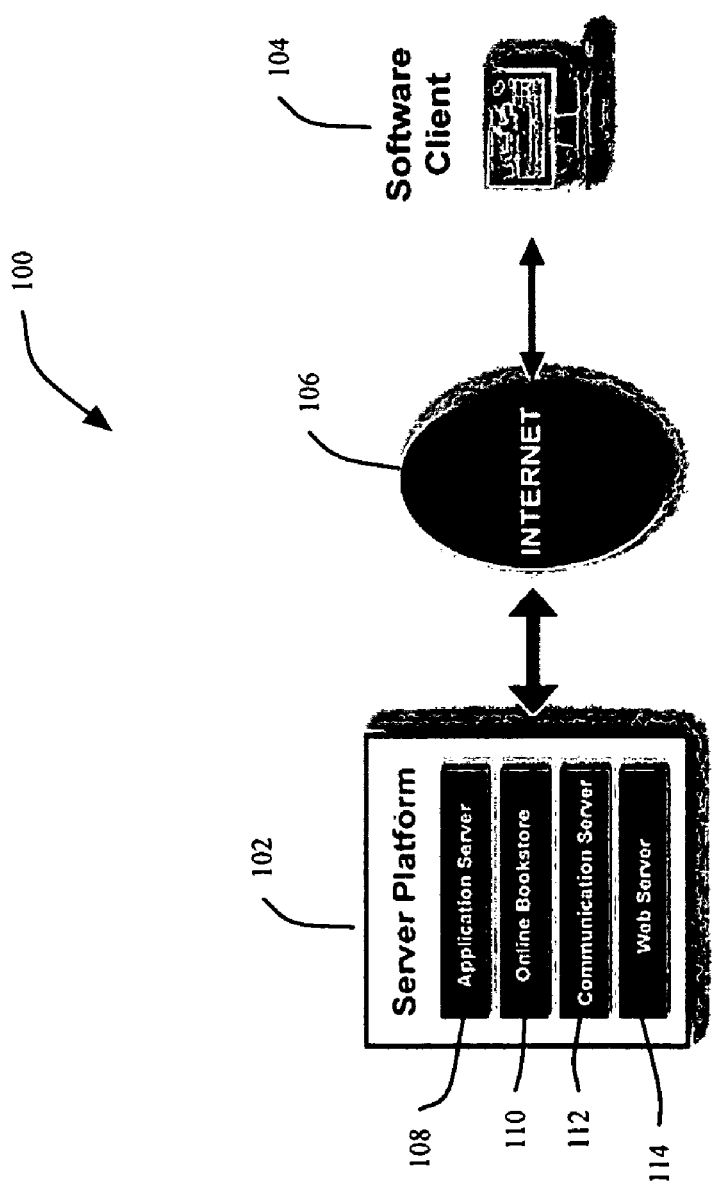
FIG. 1 is a diagrammatic view of a system overview in accordance with the present invention.
Figure 2:
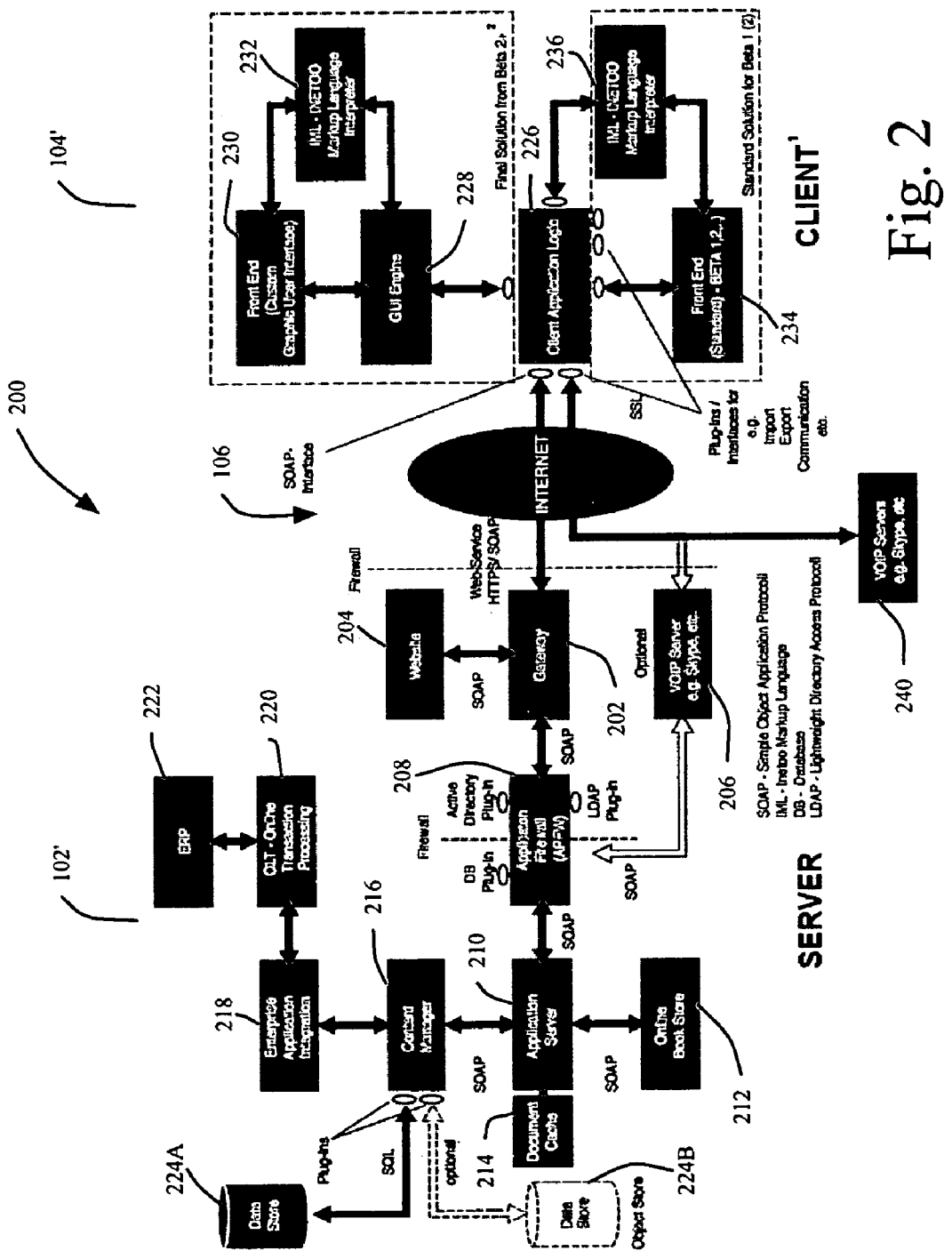
FIG. 2 is a diagrammatic view showing the details of a first system embodiment of the present invention.
Figure 3:
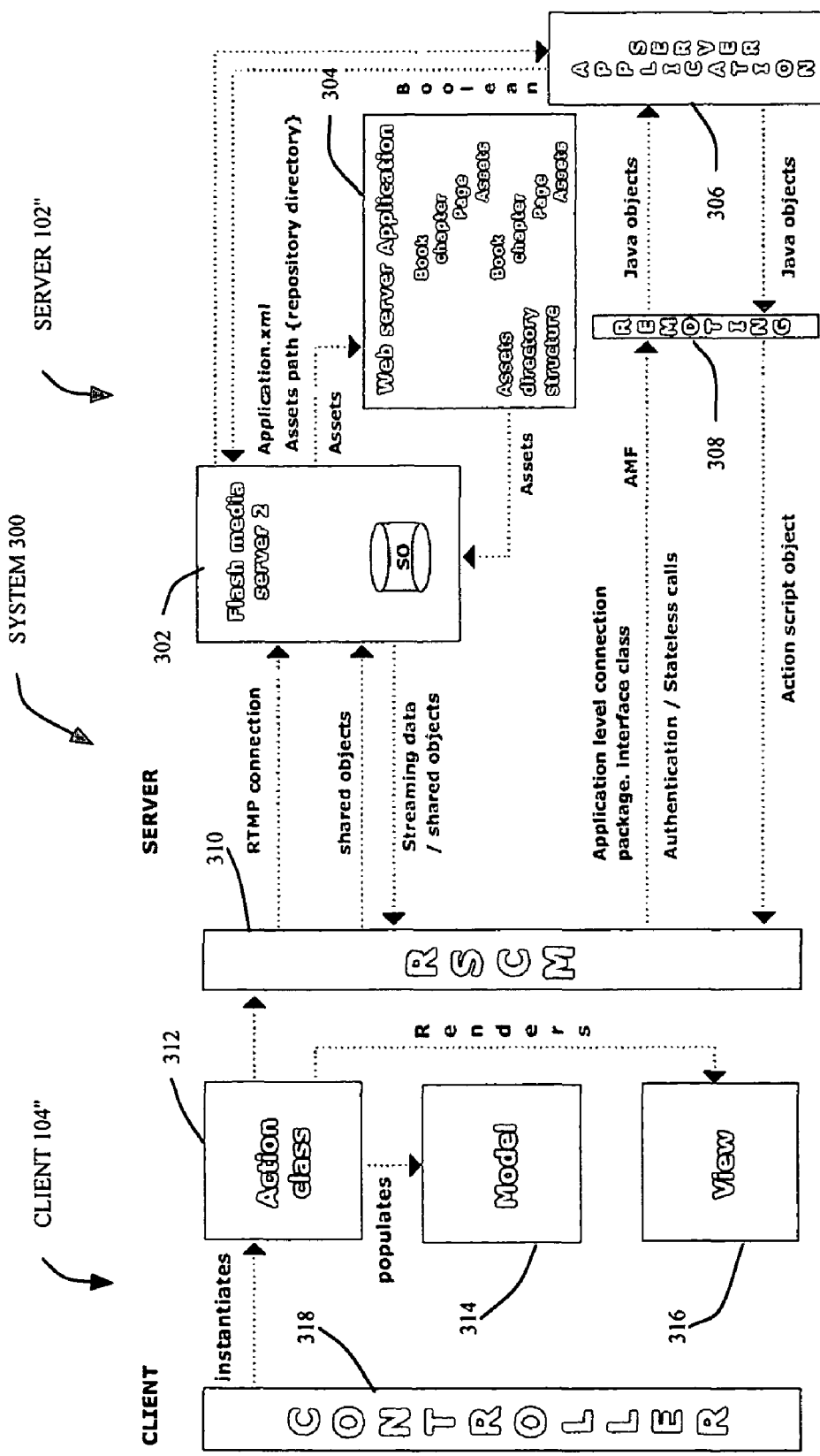
FIG. 3 is a diagrammatic view showing the details of a second system embodiment of the present invention.
Figure 4:
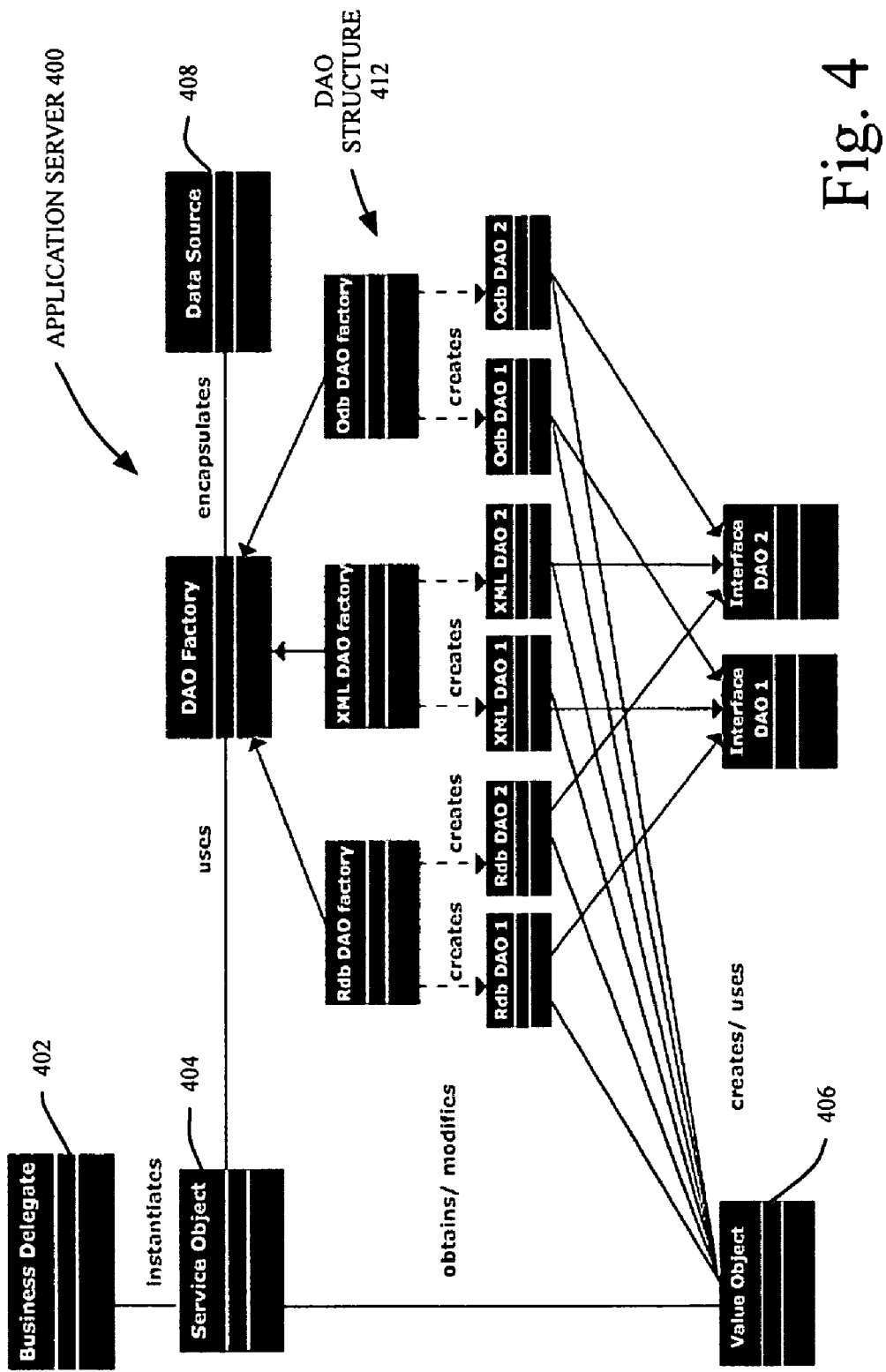
FIG. 4 is a diagrammatic view showing the details of an embodiment of the software of the system embodiment of FIG. 3.

With reference now to FIGS. 1, 2, 3 and 4 there is shown a system 100 illustrating the present invention as including a server 102 and client application 104 (client) system, the server and client providing the below-described functions through an electronic communications network such as the Internet 106. While FIG. 1 shows a high-level overview of the system 100, FIGS. 2 and 3 show detailed, alternate embodiments of the system, indicated respectively at 200 and 300. FIG. 4 shows functional details of the server of FIG. 3. Generally similar components as between these drawing Figures are indicated by like reference numerals, primed.

Considering client 104 at a high level (FIG. 1), the client is downloadable from a web site and installable for use upon client computers to perform the functions described below. Alternatively, it may also be operated with in a conventional web browser. This application, as described below, can, for example, be developed using the Flex™ 2.0 Builder, an Adobe Systems Incorporated product.

Considering server 102 at a high level (FIG. 1), the server is operated to support client functions and is seen to include at least one or more servers running the following services:
- an application server 108 for supporting applications;
- a web-server 110 running the web-services;
- an online store 112 for managing and facilitating the sale of content, and
- a communication server 114, which manages user communications via IP (data, voice and video).

Other servers, or databases might be added to support the described functionality and/or expand the services or offer new services.

Considering first the embodiment of FIG. 2, the server 102' is seen to include the functional features of
- a gateway 202 for interfacing with the Internet;
- a website 204 for providing website(s) content and interfaces to a client user;
- a VoIP communications server 206 for providing voice communications capability to a client user;
- a firewall 208 for security;
- an application server 210 for running processes described herein;
- an online bookstore 212 for managing the sale of content;
- a document cache 214 for storing content;
- a content manager 216 for managing content;
- enterprise application integration 218 for integrating a set of enterprise computer applications;

online transaction processing support 220 for managing payments and transaction processing;

enterprise resource planning software 222 for integrating data and processes; and one or more data stores 224A, 224B for storing application and content data.

The client 104' of FIG. 2 is seen to include, in two embodiments:

First Embodiment a client application logic 226 for supporting applications;

a graphical user interface (GUI) engine 228 for generating and supporting user interfaces;

a front end/custom GUI interface 230; and an XML-based interpreter 232 for converting the original content to a operating system independent user interface technology such as Flash™ or Flex™ for displaying the GUI independently of the OS specific menu layout and structure.

In a Second Embodiment the client application logic 226 for supporting applications;

a front end 234 for presenting the content to the users; and an XML-based interpreter 236 for converting the original content an operating system (e.g., Linux™, Windows™, Apple OSX™) specific dependent interface for displaying the GUI using the OS specific Menu layout and structure Internet connection 106 is seen to be connected to external service providers 240 such as VoIP and email and instant messaging services whereby to provide these functions to system users.

Considering next the embodiments' of FIGS. 3 and 4, in FIG. 3 the server 102" is seen to include:

a Flash Media Server™ 302, an Adobe Systems Incorporated product, for broadcasting the user actions and for real time text, audio and video chat communication;

a web server application 304 for providing user interfaces and content to client users;

an application server 306 for supporting applications; and remoting functionality 308, such as Flash Remoting™, an Adobe Systems Incorporated product, for communication between the client application and application server.

The client 104" functionality is seen to include:

an RSCM (Remote Service Control Manager) 310 for routing all calls from the client application to the application server and to the Flash Media Server;

an action class 312 for communication with backend;

a model 314 for mapping the data that received from the backend;

a view 316 for the visual interface; and a controller 318 for handling a request.

Considering FIG. 4, which shows the data management functionality of the server 102", the server functionality is seen to include:

a business delegate 402 to reduce coupling between presentation-tier clients and business services;

a service object 404 for servicing the request from the client to the backend;

a value object 406 for summarizing the business data;

a data source 408, for example a persistent store like an RDBMS (MS SQL server, Oracle), an external service like a B2B exchange, a repository like an LDAP database, or a business service accessed via CORBA Internet Inter-ORB Protocol (IIOP) or low-level sockets; and data access object structure 412 for accessing data stored in multiple data sources.

Considering particularly the embodiment of FIGS. 3 and 4, the server 102" is seen to include an application server 306. In the described embodiment, this application server contains the process control logic of the server side application. The backend application exposes service to the client application (such as Flex™ Client application 104) and the media server (such as Flash Media Server 302). The Flash Media Server serves content and is responsible for caching the XML content. The Flash Media Server 302 is used for broadcasting the user actions, and also for real time text, audio video chat communication.

Communication between the client application 104" and the application server 306 is through means of remoting (such as the Flash Remoting gateway 308). The Flash Remoting engine is installed on the application server 306. Tomcat™ 5.x could, for example, be used as the application server. Communication between a database (such as MSSQL™) and the application server could be by means of the DAO (data access object) layer 412, acting as an adapter between the component and the data source. As noted above, the application server 306 further supports an online bookstore enabling the sale and purchase of various content, a communications server enabling communications between the server and the client, as well as between various clients, and a Web server for interfacing with the Internet in a conventional manner.

With respect particularly to FIG. 4, the data source 408 functions as the central repository of all data that the system would generate and query for data. MSSQL 2000 could, for example, be used as the database. The application will, in some embodiments, have support for multiple databases of various types. The business delegate 402 reduces coupling between presentation-tier clients and business services. The business delegate hides the underlying implementation details of the business service, such as lookup and access details. The business delegate acts as a client-side business abstraction; it provides an abstraction for, and thus hides, the implementation of the business services. Using a business delegate reduces the coupling between presentation-tier clients and the system's business services. Depending on the implementation strategy, the business delegate may shield clients from possible volatility in the implementation of the business service API. Potentially, this reduces the number of changes that must be made to the presentation-tier client code when the business service API or its underlying implementation changes.

Data Access Object (DAO) pattern 412 will be used to abstract and encapsulate all access to the data source. The DAO manages the connection with the data source to obtain and store data. The DAO implements the access mechanism required to work with the data source. The data source could be a persistent store like an RDBMS, an external service like a B2B exchange, a repository like an LDAP database, or a business service accessed via CORBA Internet Inter-ORB Protocol (IIOP) or low-level sockets. The business component that relies on the DAO uses the simpler interface exposed by the DAO for its clients. The DAO hides the data source implementation details from its clients. Because the interface exposed by the DAO to clients does not change when the underlying data source implementation changes, this pattern allows the DAO to adapt to different storage schemes without affecting its clients or business components. Essentially, the DAO acts as an adapter between the component and the data source.

Figure 4A:
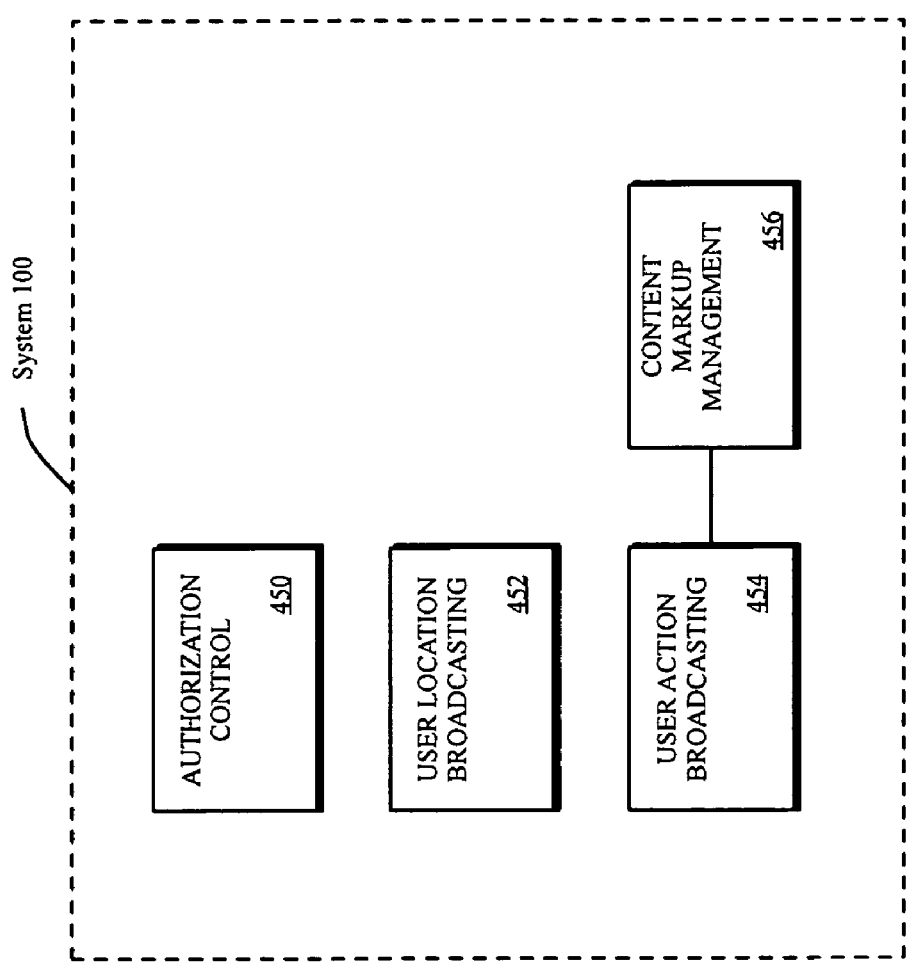
FIG. 4A is a block diagram showing certain functional features of the present invention.

With reference now to FIG. 4A, certain beneficial functions of system 100 are illustrated, the details of which are described below. Particularly, an authorization control system 450 is provided for enabling certain managerial users to control the access and functional interaction of certain other users. A user location broadcasting system 452 is provided for broadcasting the location of certain active users of the system to other users of the system. A user action broadcasting system 454 is provided, along with a content markup management system 456, for enabling users to mark up the viewed content, the mark-ups being broadcast for viewing by other users. It will be understood by the reader that these functions may be implemented within the system 100 including the server 104 and client 102, the functions implemented in software, special purpose hardware, programmed general purpose hardware, or combinations of the foregoing. The detailed operations of these functions are described here in below.

In one embodiment of the invention, the XML format of the content contained in and managed by the system may be modified to include special tags so that the system 100 is readily able to identify, for example, which content has been copied. In this embodiment, when a user highlights and selects content, the starting point and endpoint, along with the title of content, line and page information is picked up and stored in the form of a tag. When this content is copied, for example into a note, the system will use the tags to look up the original content and not the copied content, whereby to display the text. In this manner the content does not get duplicated each time a user copy/pastes content to a note. This method of tagging significantly reduces the storage requirements while requiring more processing for assembling page requests. It will be understood by the reader that numerous modifications to conventional XML can be made to facilitate the operation of the system.

While the system structure has been described with respect to several different embodiments, it will be understood that the invention is not thus limited. Any appropriate computer type(s) may be used to implement the server structure and functionality, in a localized or distributed manner. Numerous other structures and configurations will be apparent to the reader. Different users (e.g. authors, professors, teachers, consultants, students etc.,) may access the system using specialized clients, available for different operating systems such as Windows™, Linux™ and OSX™ Apple Macintosh™, that can be downloaded and installed on local computers.

As used herein, references to system 100 will include all embodiments of the invention described above, as will references to the client 104 and server 102.

System Users

With reference to FIGS. 5-8, FIG. 5 describes the different participants and groups that interact with the Internet-based system 100. The system, as described above, facilitates communication (text message, voice and video over IP), stores content and allows users to interact with the content and other users, via the functionality described above. Users generally include any party(s) having access to system 100 for adding content to and/or accessing and using the content on the system. Users can comprise, for example, individuals 502, and groups 502A-502D, the groups themselves comprising subgroups and/or individuals within groups. As described here in, the formation of groups along with the various' content they have access to is accomplished through the use of authorizations and permissions.

Figure 5:
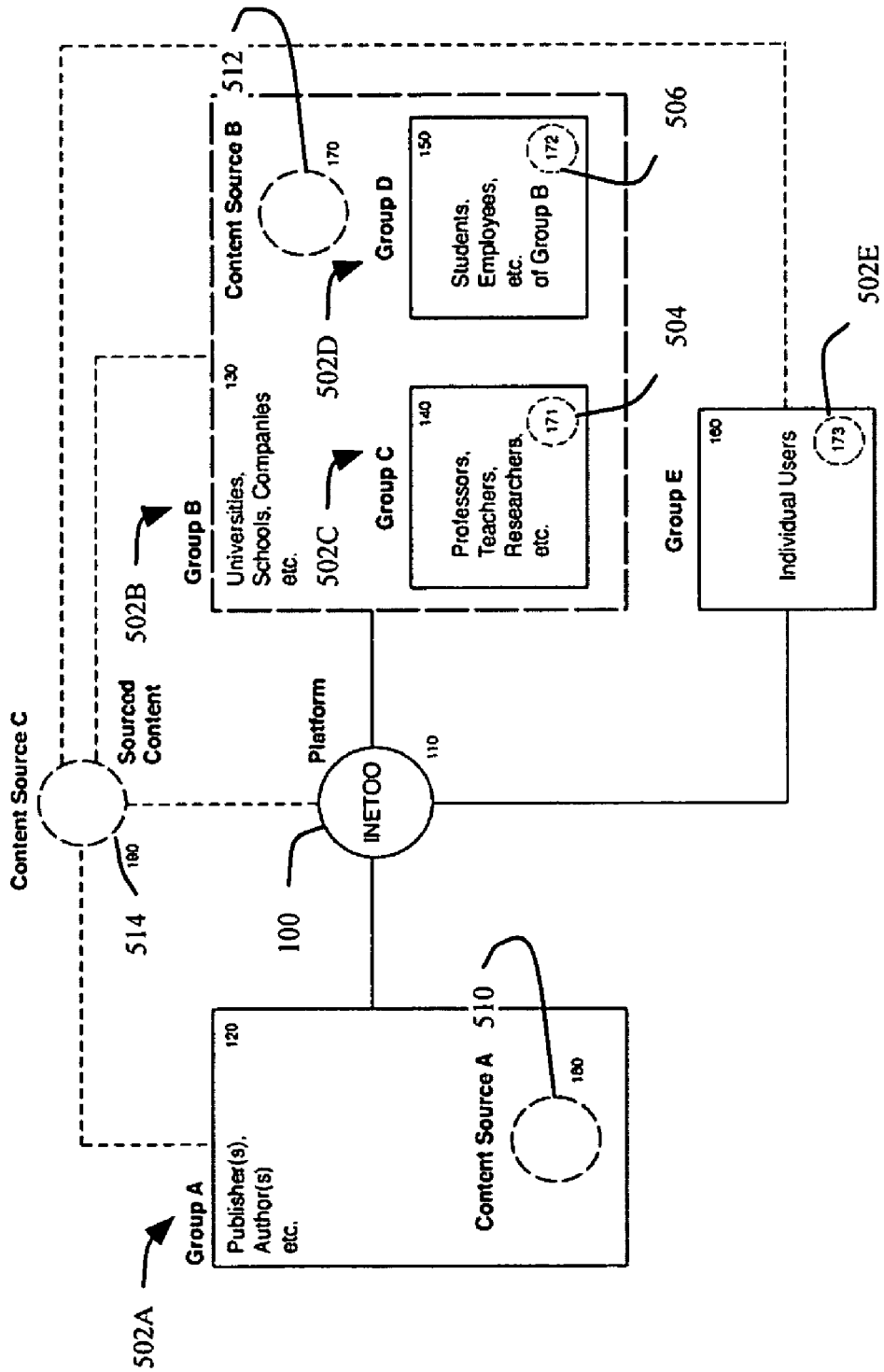
FIGS. 5, 6 and 7 are block diagrams showing the inter-relationship of various users of the present invention as between themselves and the system.

Each group in FIG. 5 may own and/or have access to different content, in some instances shared content and in some instances content proprietary to a group. Publishers and authors in group 502A, for example, may have proprietary content, indicated as content source A 510. In addition, each member of this group may have agreements with each other relating to the use and copyright of this content A. Members of group B, in the present example university members, may have their own proprietary content, indicated as content source B 512. In addition, members of groups C and D may each have personal content indicated at 504, 506 respectively, which they own individually and use regardless of their relationship to the group B. Finally, individual users 502E, those who do not have a relation to group B, may have personal content 502E, for example self-generated content and owned copyright, and have access to shared content source 514, which can comprise freely available public domain information (e.g. from Internet). Note that each group and members of all groups may in addition have access to this content source 514.

The system 100 enables different users, who may be associated with different groups, to offer content, exchange content, discuss, and collaborate with content, provided they are owners of or otherwise have access to the respective content. While the invention has application in numerous different environments such as R&D, consulting, e-learning, it is generally described herein with respect to a classroom environment—for example a university environment.

Figure 6:
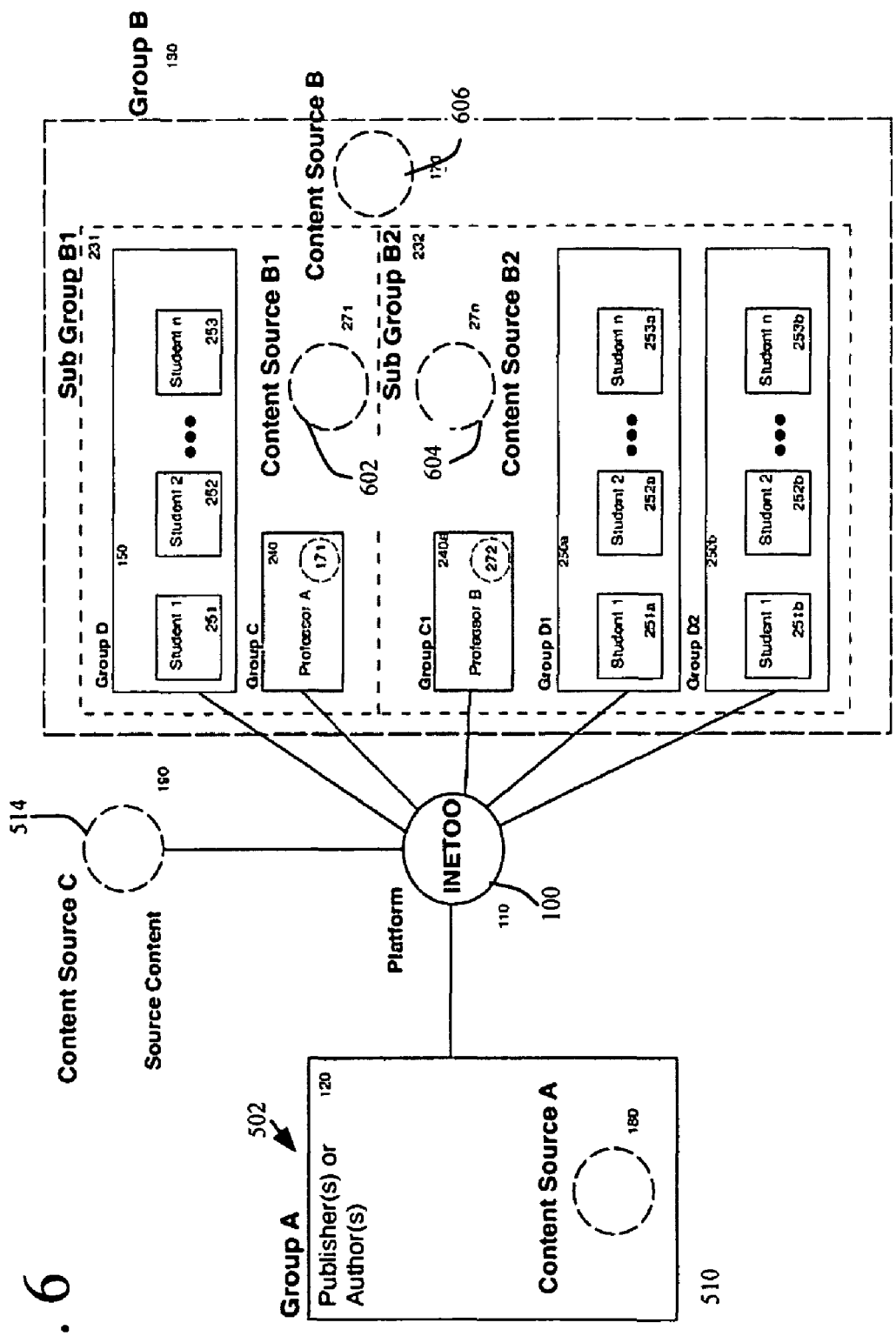

FIG. 6 shows that a group, such as group B representing in this example a university, may contain different sub-groups B1, B2, etc. such as schools or departments, each having access to one source content B and/or other content sources 602, 604 etc. Each subgroup may contain one class group D1 with several students or several classes groups D1/D2 etc. of which there is one or more professors. Several professors of a group C may also have several classes they teach in Group D and vice versa. The University may provide content source B 606 and the departments (subgroup B) may also own other content sources 602, 604 or one or more members can be part of group B having possibly access to one or multiple content sources B.

It is also contemplated that members of a group such as B, C, D, etc. may each also have their own proprietary content sources they will use. Content owned or generated by a group can be made available to other group B and its members. A group can supply additional content, to both subgroups and the members of other groups. Each group controls the access rights to their content. Members outside of a group only have access to a content source if authorized. In the described example professors each have content available for their respective students.

It is further contemplated that groups may contain subgroups which may represent universities, schools, departments, faculty, professors, TA (Teaching Assistants), student speakers etc., thereby expanding the structural relationships described. In addition, it is possible that several members, for example students, of one group may also be members of other groups; similarly professors belonging to one group may also belong to one or more other groups.

Figure 7:
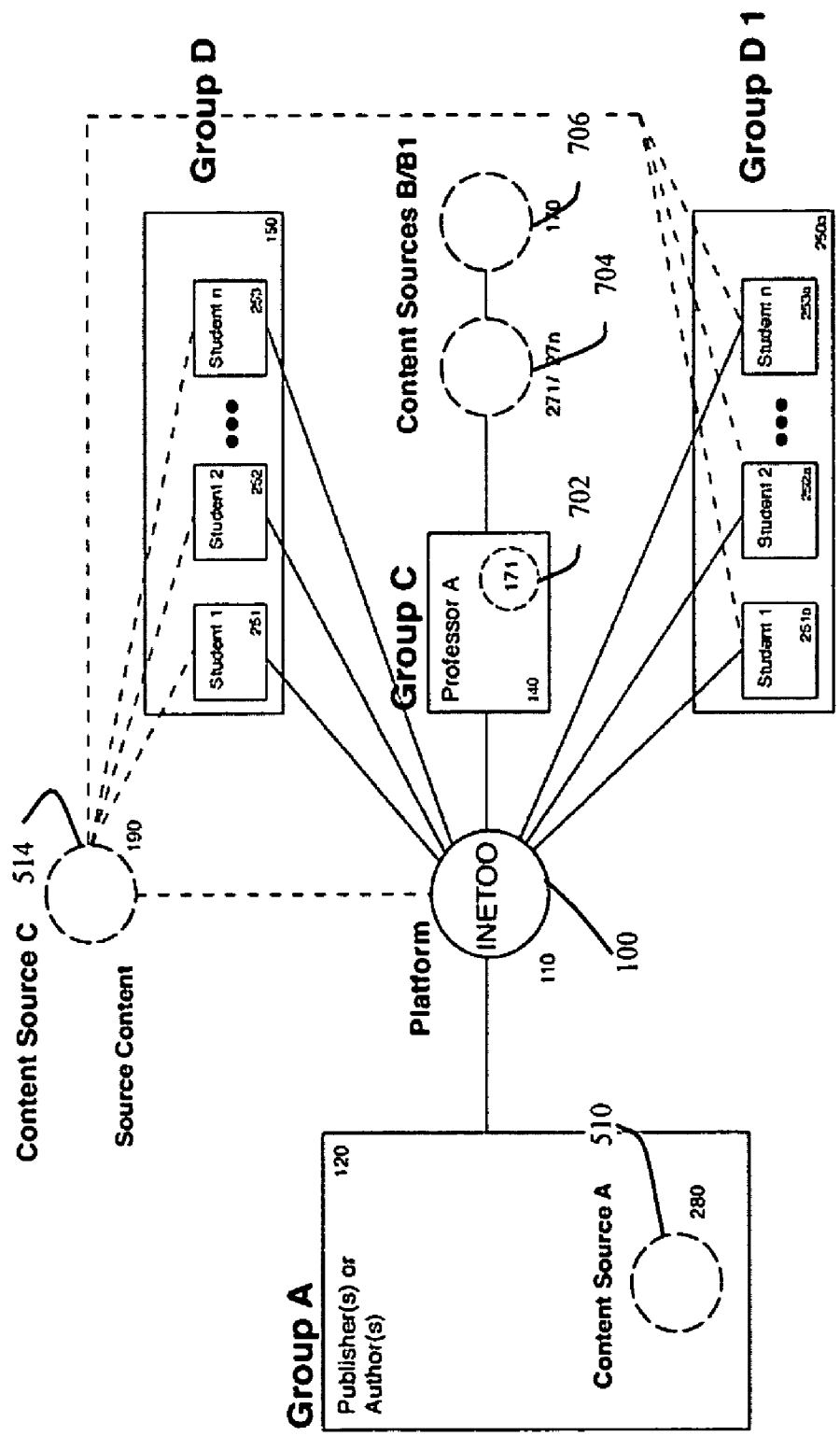

FIG. 7 shows that while professors have access to content sources within the university 704, their department 706 or their proprietary content 702, students and professors may also source other content, such as content source C, for example through the Internet. With the system 100 of the present invention, different users are thus seen to be able to source content from many different sources, including both proprietary sources and shared sources.

Figure 8:
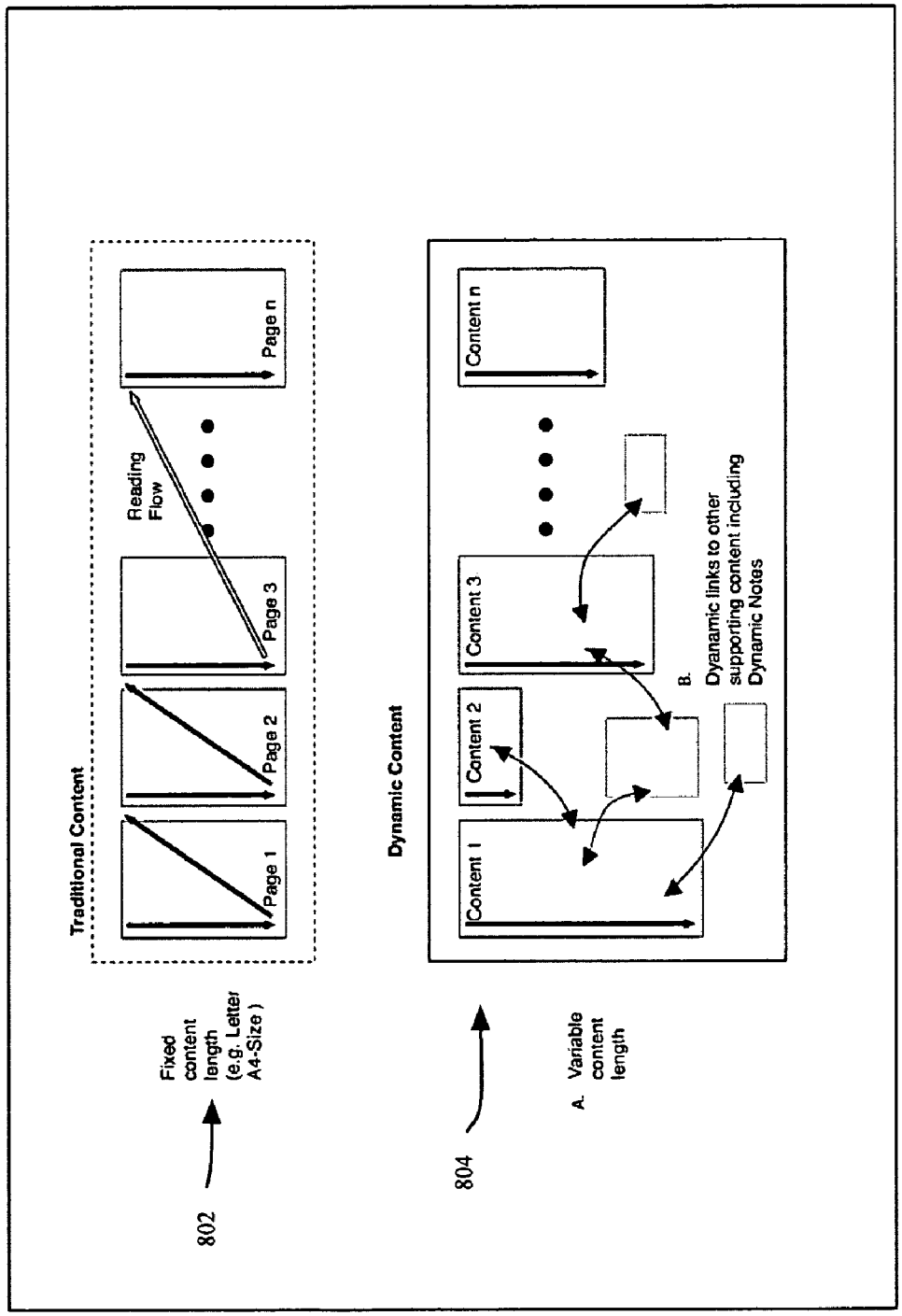
FIG. 8 is a block diagram showing the content flow relationship between content processed by the present invention and prior art, traditional content.

FIG. 8 visually illustrates the difference between traditional content including e-books, which are page-based 802 and generally linear in format and consumption, and the dynamic alterable content capability 804 provided by the present invention, which may vary in length and depth as content is dynamically interlinked with other files that are integrated/attached by different groups such as groups A, B, C, D described above. As a result, content processed using the present invention becomes dynamic with input from different users who work with that same content.

Dynamic Content Overview—Layers and Hidden Layers

Figure 9:
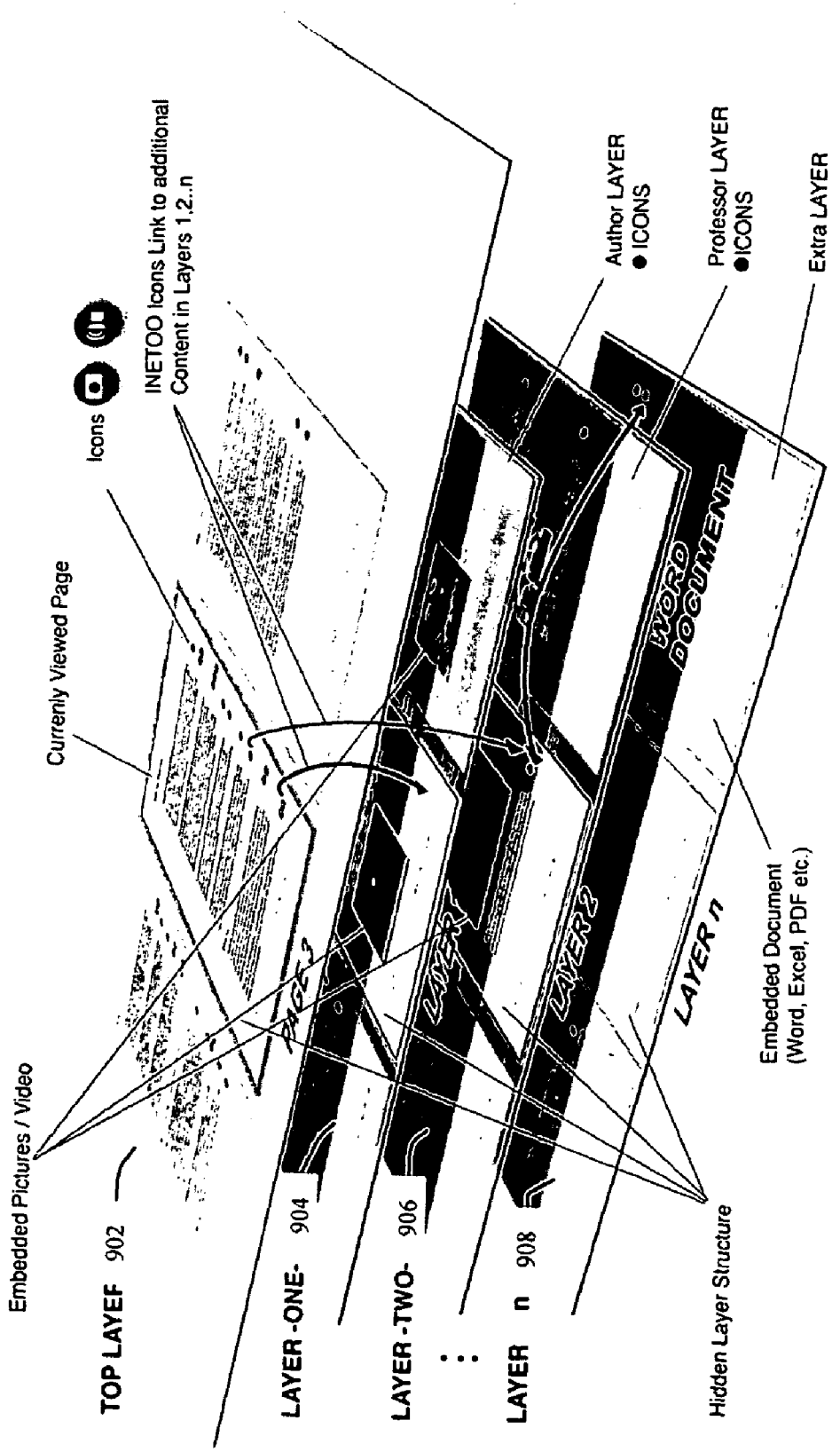
FIG. 9 is a diagrammatic view showing layers of electronic content in accordance with the present invention.

With reference to FIG. 9, once content has been imported into the system 100, multiple electronic layers are added for the inclusion of markups, etc. as described. Exemplary layers are indicated at 902, 904, 906, 908. Additional content (such as pictures, videos, charts, voice, data, notes, charts, etc) can be added/embedded and the contents' respective rights are added to the layers whereas the physical content will be stored ordinarily either locally for private content or server-side for shared content depending on the rights of the content owner. Typically, the system creates a new authorization level for each user and/or user group(s), whereby layers are defined, wherein additional content can be embedded into the original content through the use of icons in the manner described below.

As noted above, layers refer to a group or groups of content which may be visible to or hidden from view depending on the access rights of a particular group or user. Each layer holds respective authorization rights and is independent of the local or server-side storage method or the physical storage location of the content. Authorized users can add or embed content to any extent and complexity, independent of time. The added, embedded content can be accessed when clicking, for example, on embedded icons or reference links. To reduce information complexity, any specific supporting content such as supplements, videos, charts, pictures etc. or other content is retrievable on demand. One advantage of using hidden content layers in accordance with the present invention is that the same content (visible and hidden content) is available to all users with different levels of experience in the subject. Because this additional supporting information is available at the user's request, all users will be able to stay concentrated and focused on the subject. All content will remain intentionally on the server except for private non-shared content, whereby the content is sent to users individually via page or content requests. This method can further be used to implement control over digital rights management, whereby most potential legal misuse can be controlled.

Figure 10:
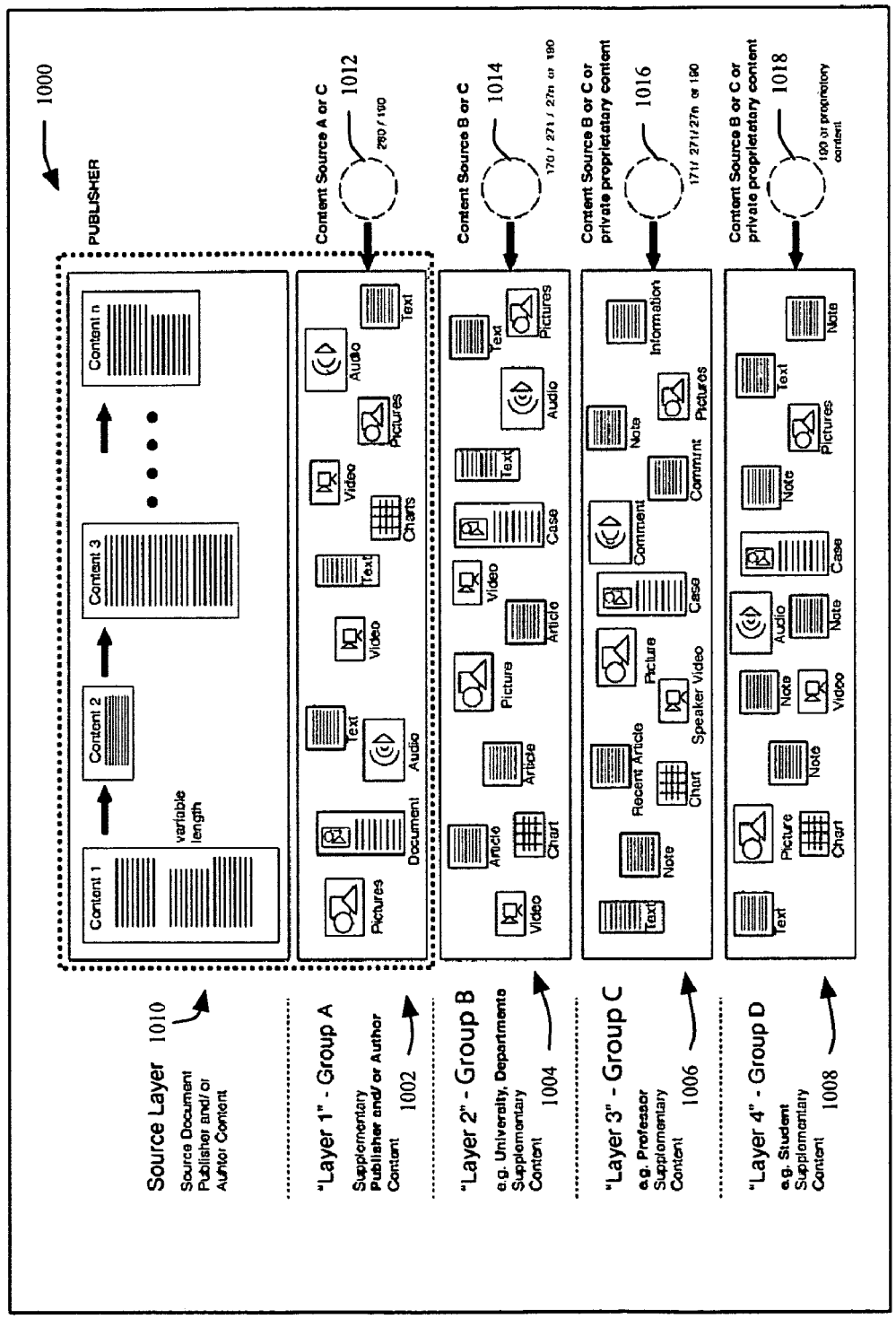
FIG. 10 is a diagrammatic view again showing layers of electronic content in accordance with the present invention.

With respect to FIG. 10, a different view of the system 100 dynamic content is shown to consist of numerous files and chapters 1000 that are attached by different user groups and various content sources. Each user receives different access right depending on his authorization level (e.g. author, publisher, university, professor etc.). The Figure shows an example structure, where publishers provide the source layer 1010, containing content of various lengths. Similarly authors could provide publishers with a similar layer to supply the content to the publisher. Layer 1004, belonging to group A, includes source content plus supplementary supporting content 1012 that could be added by the publisher (or author). When the content is offered to members of group B in layer 1006, like a university, this institution can add further content 1014 from the source and/or supplementary content to this layer 1002, whereby the layer will be a unified authorization level rather than representing a physical location of the content. In other words, the layer or level will indicate which users have access to the content located at this authorization level. Professors can add their content such as cases, notes, videos, audio commentaries etc. 1016 to their 'level' 1008 derived from various content sources and authorize students in layer 4, group D, 1008 the appropriate access authorizations. For each class professors may use one predefined layer 1008. Students have the option to also add their own personal content from a supplemental content source 1018. Users may be asked to conform to copyright laws as appropriate.

Figure 11:
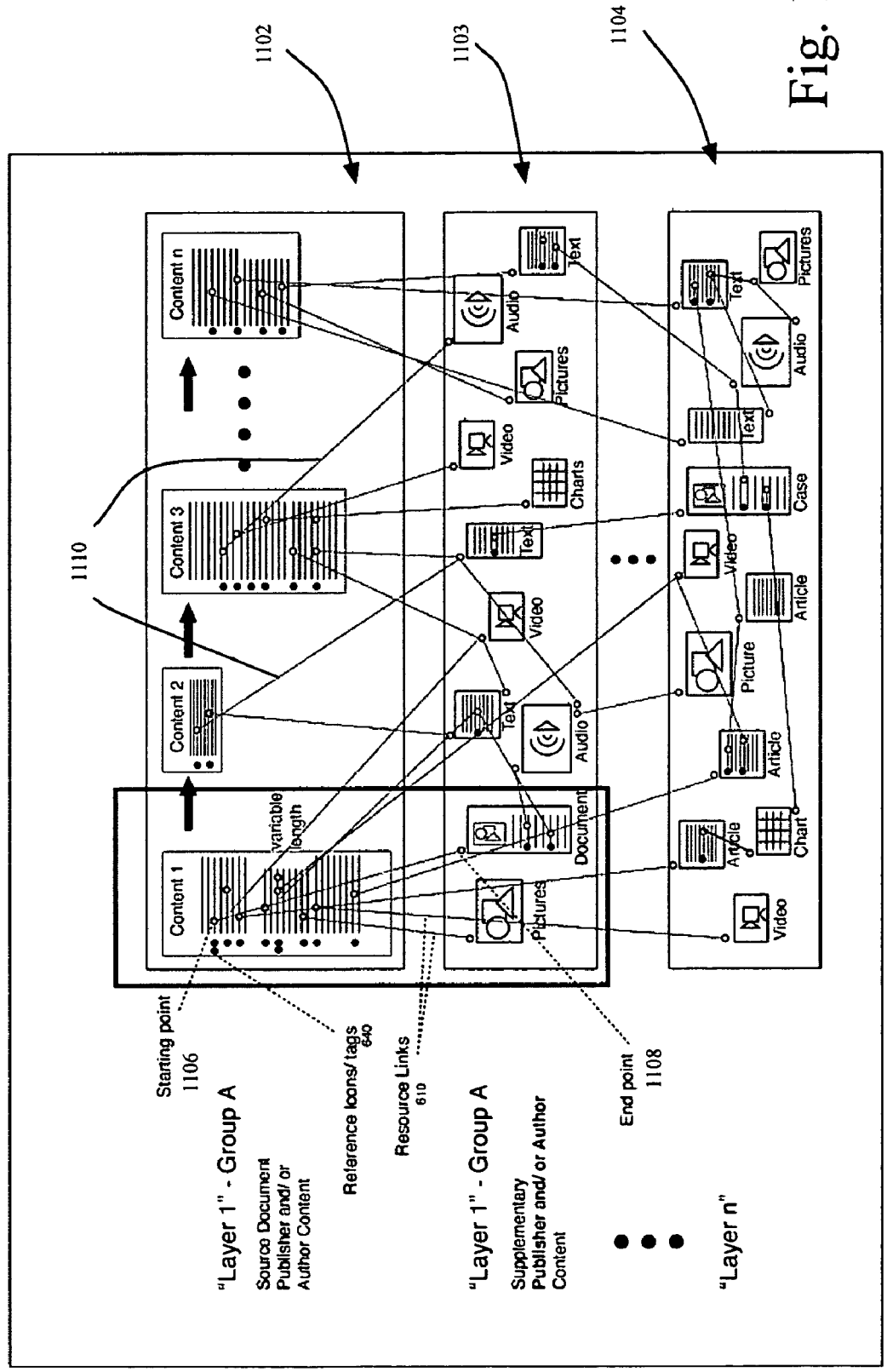
FIG. 11 is a diagrammatic view again showing layers of electronic content including links in accordance with the present invention.

FIG. 11, shows an example of layer linking, described in further detail below, including a source layer 1102 and a second layer 1103 and an Nth layer 1104. The Figure illustrates how each piece of content is interlinked with other content. Only the owner of the content is able to add and modify the link. To link content, users need to create an invisible starting point or anchor point 1106 in the source text, after which the appropriate shell can be selected that will contain the respective file format (audio, video, note, document, spread-sheet, picture, etc.). Upon attaching the supporting document file or content or copy—pasting the content, an end point 1108, a note or indicator is generated linking to the starting point 1106. Numerous links 1110 are shown. FIG. 11 is intended only to illustrate the concept of linked content layers, with details of marking and dynamic linking described below.

Document Markup: Tags, Icons, Notes & Authorization

Figure 12:
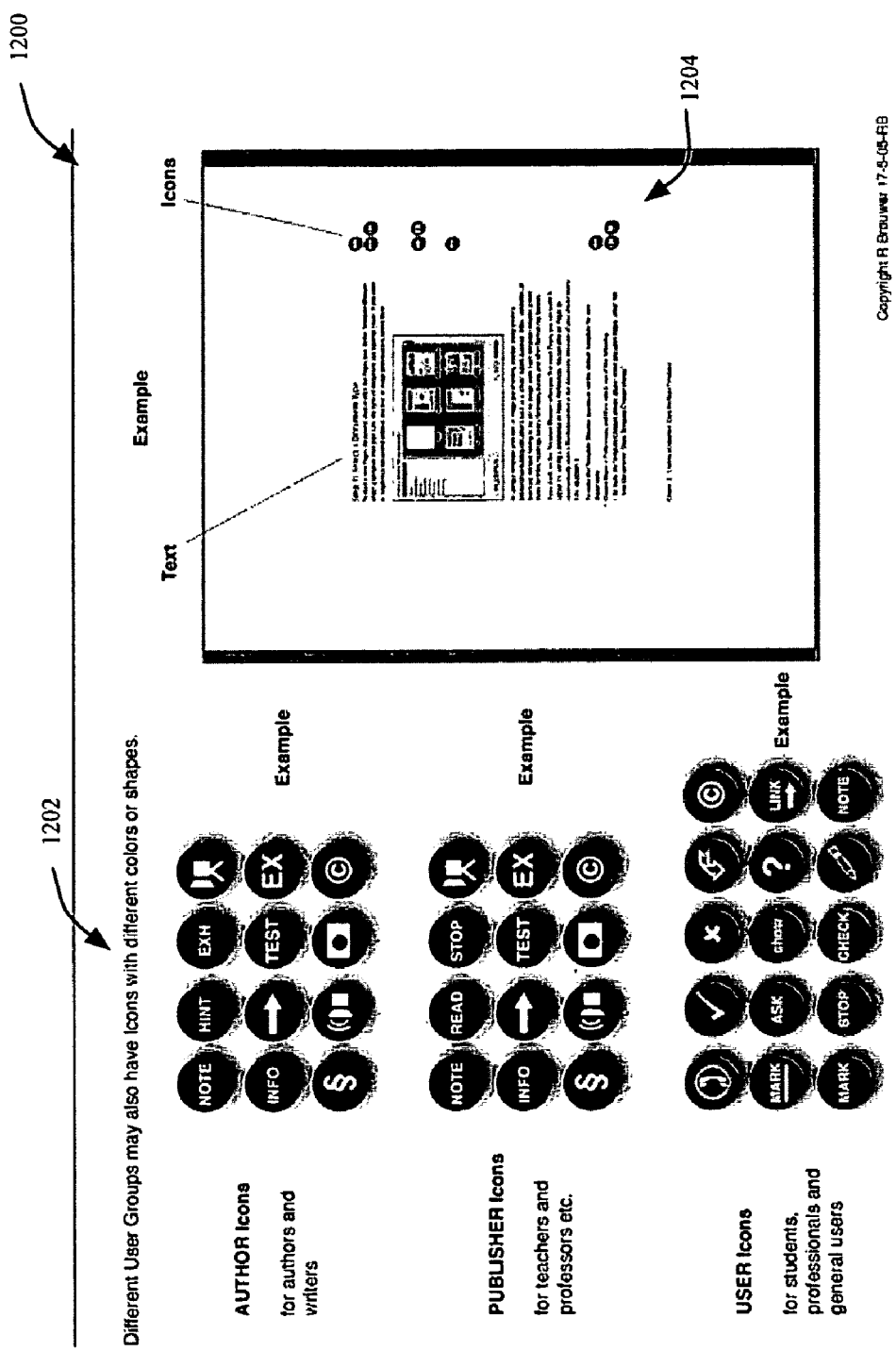
FIG. 12 is a diagrammatic view showing icons for content markup in accordance with the present invention.
Figure 13:
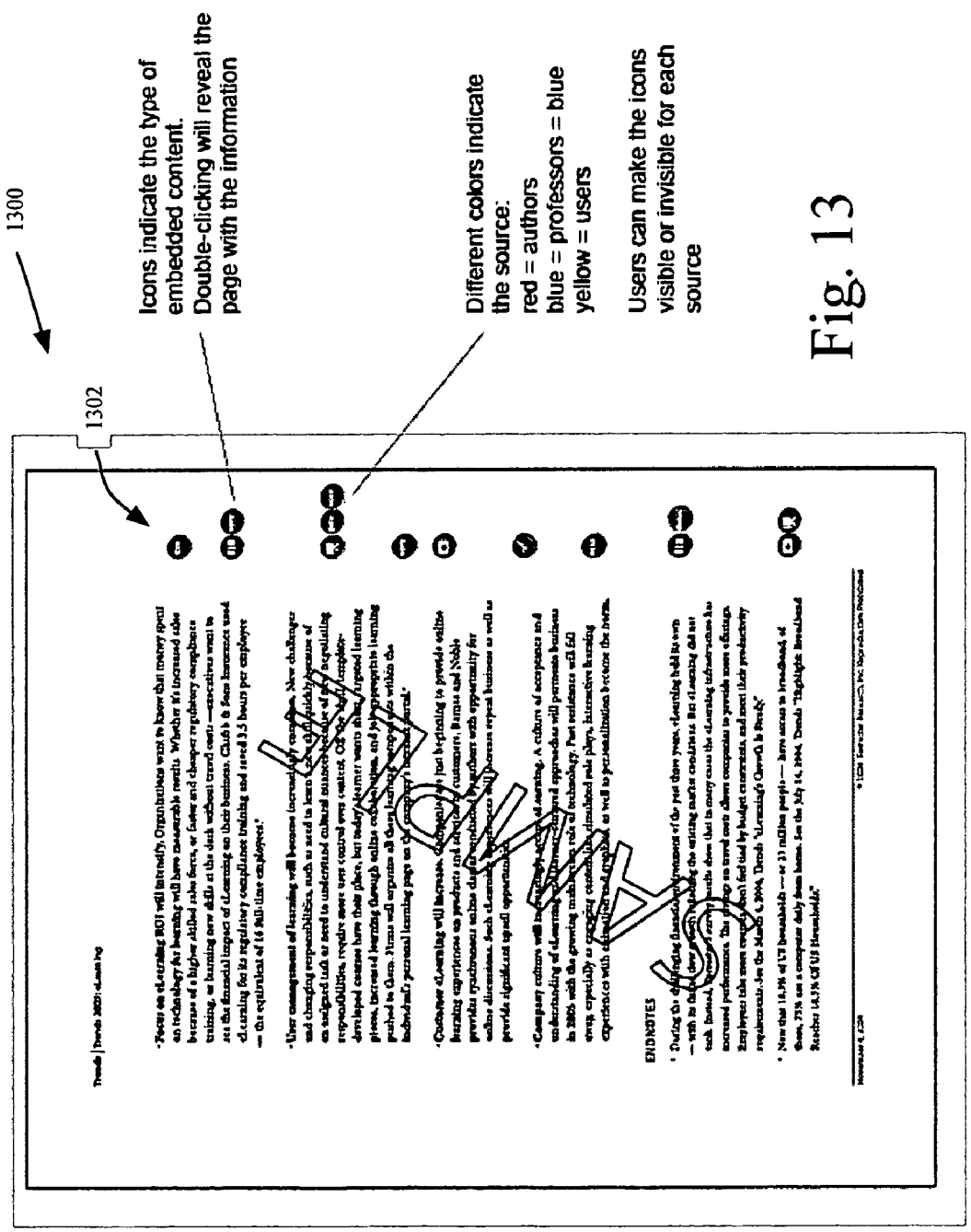
FIG. 13 is a diagrammatic view of another view of an electronic document marked with icons in accordance with the present invention.

With reference now to FIGS. 12 and 13, icons, generally indicated at 1202 and also in the margins 1204, 1302 of respective sample pages 1200 and 1300, are used as links to indicate a type of hidden content (such as video, text, audio, notes, hints, etc.). The icons can be placed in any part of the electronic content, showing users the type of hidden supporting information (such as detailed information, files, links to other sources etc.) that can be found in the hidden, or currently non-visible, layers. These icons guide users through the various hidden layers, linking to added content which helps to clarify meaning and understanding of the relevant subject. Different colors or shapes of the icons can signal different user's groups. For example, red icons can be set aside for instructors, while blue icons are for professors and orange icons are for users such as students. All embedded content or information is cross-linked to at least one location in the content (e.g. document, book, etc). An icon is placed at the same text-line of the text where a starting point for a link is indicated (see FIG. 11, above, and FIG. 15, below). The starting and end points are in fact invisible anchor points that link the two documents together at the location in the source text where they relate in context.

Users can read and work through the content layers to any desired or necessary extent and return to the main layers at any time. Icons and content can be added at any time by authorized users to authorized layers.

Besides highlighting and marking text, users can also place user icons, add visible or embedded notes, comments, etc. thereby showing changes, remarks, ideas, thoughts etc. in the text. Users can use these icons either for themselves or send these icons and the linked information (layer(s)) to other authorized users.

Figure 14:
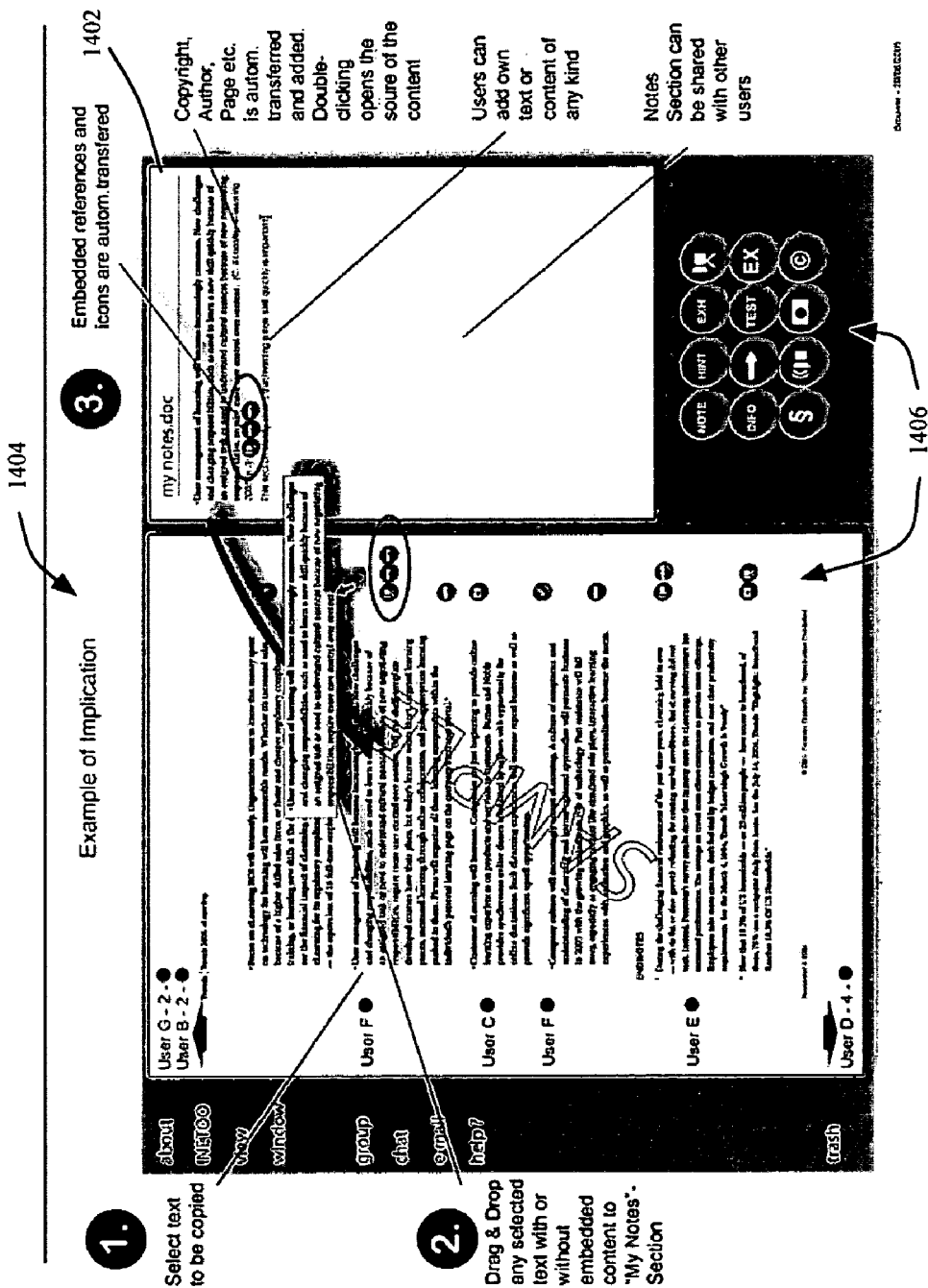
FIG. 14 is a diagrammatic view showing an electronic document marked with notes and icons for content markup in accordance with the present invention.

With reference to FIG. 14, to facilitate the learning process, users can also copy/paste or drag/drop (when authorized) any sections of the electronic content/book—including any embedded content plus icons—to a note section 1402 and add or include further comments and information from other sources. As shown, the Figure includes the note 1402 associated with a content page 1404 and various markup icons 1406. When a text selection or an icon has been selected and is copied into a note, the note receives the same type of icon display revealing the type of information that has been embedded. In the described embodiment, any copyright information (e.g. author name, content name, date, page etc.) can then be automatically transferred and embedded into the notes section. When authorized, users can exchange, share, synchronize the notes and/or contents with other users and build a personal knowledge base of content and markups and dynamically linked comments.

Figure 15:
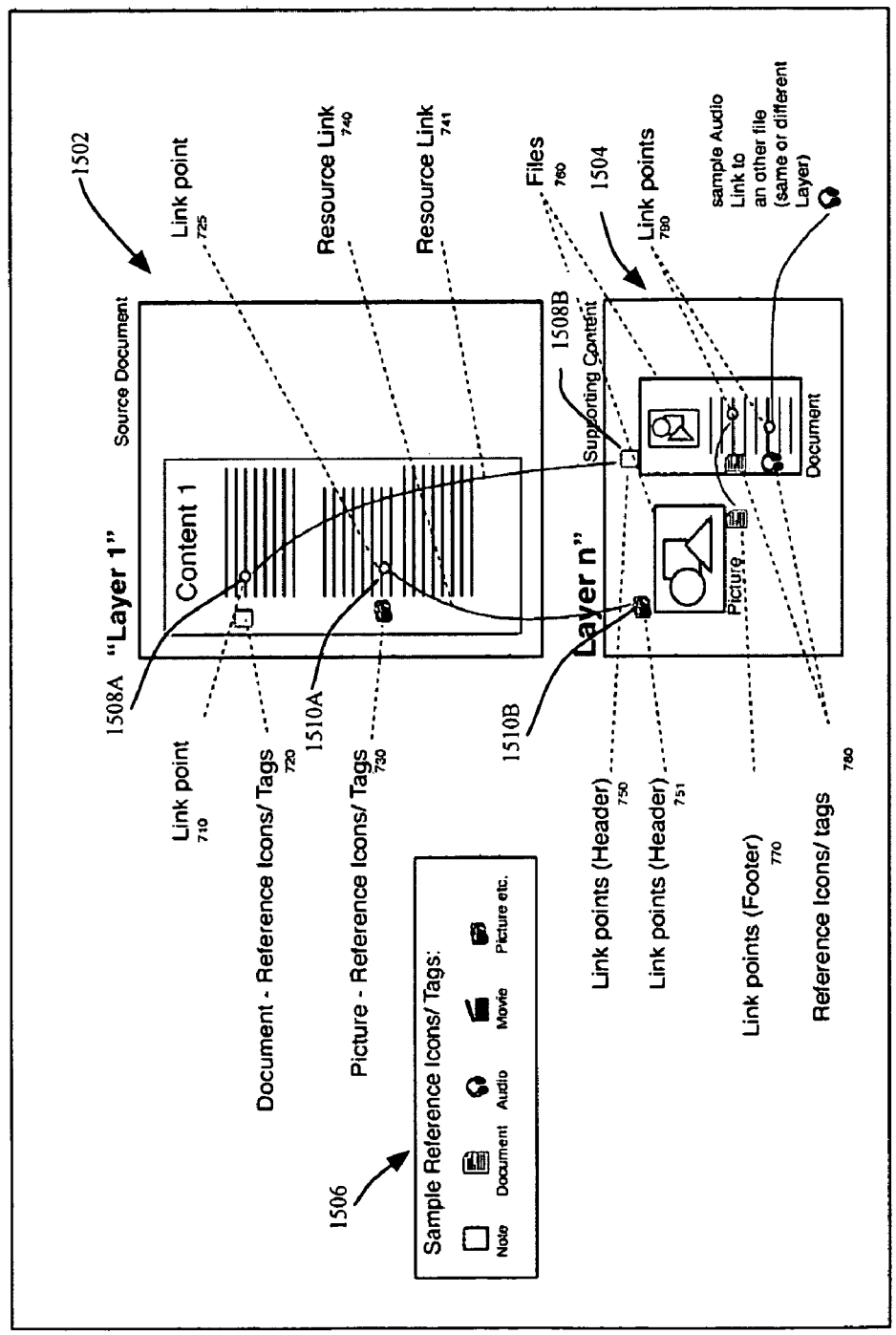
FIG. 15 is a diagrammatic view again showing layers of electronic content including links and markups in accordance with the present invention.

With reference to FIG. 15, sample icons are shown at 1506, along with two content layers 1502, 1504. Two dynamic links are indicated, 1508A-B and 1510A-B, each between the two layers of content, each including an appropriate starting icon 1508A, 1510A, indicating the start of a link, and an ending icon 1510A, 1510B, indicating the linked material including an icon selected to indicate the material type.

Figure 16:
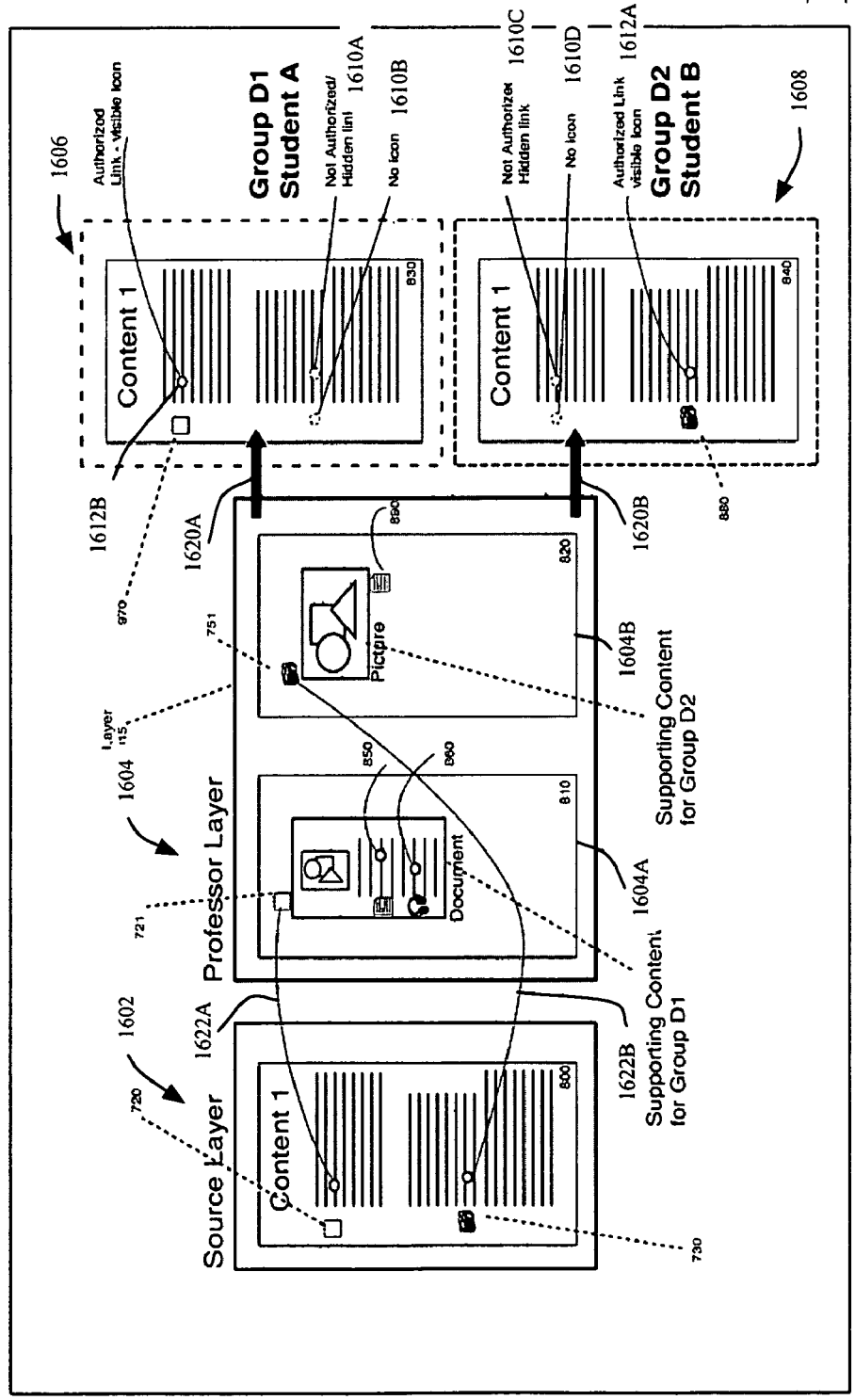
FIG. 16 is a diagrammatic view again showing layers of electronic content including authorizations, links and markups in accordance with the present invention.

With reference to FIG. 16, there is illustrated the relationship between the different user groups and their respective authorizations levels for working with the content. Icons and the content they are linked to will be visible, depending on the authorizations, to the various authorized individuals and groups. Shown in the Figure are a source layer 1602, a professor layer 1604 and two student layers indicated at 1606 and 1608. Content from source layer 1602 is linked into the professor layer 1604 via links 1622A, 1622B. Professor layer 1604 includes content 1604A intended for student group 1606, and different content 1604B intended for student group 1608. Authorizations are indicated diagrammatically at 1620A, 1620B. For example, a professor may have received a document from source layer 1602, for example from a publisher. In this example, the publisher's additional layers containing supplementary content have been omitted to reduce complexity. The professor will add his content 1604A, 1604B to a specific layer, 1606 and 1608, respectively, where each layer may have specific authorization levels for different groups. As described, many different types of icons, markups and links can be used. In actual practice, authorizations and permissions are entered into system 100, for example using standard authorization and permission tools and practices as enabled by authorization control system 450 (FIG. 4A), as will be well-known to the reader.

In the example in FIG. 16 a professor adds a document 1604A to a source layer 1602 for one classroom 1606 and a second document 1604B including a picture for a second classroom 1608. Both documents are authorized for different groups and are placed on the same authorization level, even though the documents have different access rights. When students form group D1 (layer 1606) and group D2 (layer 1608) purchase the electronic content from the electronic bookstore of system server 102, both will receive the specific book containing the source layer including their specific authorized layers from the professor. In the example above group 1606 student A receives content 1604A represented by an icon 1612B containing the document authorized for viewing by the professor, while student B of group 1608 has the same document except that it contains the picture (that is, a dynamic link to the picture) from content source 1604B, indicated at 1612A. For student A the picture content is not accessible, while for student B the picture is accessible and an icon 1612A is visible.

Further provided for the benefit of users are filters to activate the appropriate icons the viewers are interested in seeing. For example, students may activate the professor-icons containing only notes containing audio comments and later add for instance other note icons from friends. In addition, users can activate the latest notes that arrived or display reference icons containing content from publishers and authors. Hidden, or non-visible, icons are indicated at 1610A-D, indicating dynamic links, which have been filtered out but can selectively be made visible. Such filtering may be implemented, for example, through interaction with the user action broadcasting system 454 (FIG. 4A) by users interacting with system 100.

The functions and restrictions of the user groups are typically managed and restricted from the server side. Within this authorization process, users or user groups can be assigned and/or restricted different rights. Users or user groups can also be assigned certain privileges such as access to content, and specific layers uploading or selling content (such as documents or books), custom publishing layers, rights to copy specific content, etc.

It will thus be understood that the present invention provides for authorizations by content owners, controlling who the content will be made available to, as well as filters for content viewers, controlling which content is displayed for viewing, particularly with respect to document markups. As described, these authorizations and filters are typically controlled by the server side of the system, which may be addressed directly or through the client. It will be understood that such functionality may also be implemented, in different embodiments, within the clients and/or as shared functions between the server and client.

It will thus be seen that, from a consideration of the above, content may be flexibly controlled and made available to individuals and/or groups using authorizations to control distribution of secure access rights to the respective content. Content thus appears to the users to be contained in layers, the layers comprising virtual electronic representations visible to authorized users. Content may be marked up, with the content itself and/or the markups connected within the content by dynamic links. Each dynamic link indicates a reference to different content location(s) and/or user comments, the markup typically hidden except for representation by an icon. Users may be addressed and managed by the system individually and/or in groups; groups typically defined as multiple parties having authorized access to the same content for the same specified amount of time, as determined by the content owner. The system thus provides significant flexibility as to how content and markup re made available to users, while also providing security and very finely distinguished access control as between content, markup and users.

Operation of the System: Overview

When authorized, the following functions and more can be performed by users:

Authoring/inserting content (e.g. documents/books etc.). Authorized users like authors or professors/teachers can, for example, import existing book/document files into the clients and upload these to the server(s), where they can be sold at the online store.

Layers can be added and access rights can be set. If, for example, one user wants to add his notes for a specific assignment, he or she will add one layer and name this layer. He can then specify which user or user group (e.g. professor, student) may view or edit this new layer.

Users can establish communications over the network such as the Internet to contact other users. Third party Voice over IP protocols can be used for communication.

Communication groups can be established. Entitled users like professors and/or teaching assistants can assign other user(s) to join a specific discussion group or forum to discuss, read, edit a document or just communicate about any topics they like.

Users can preview and read sections of content/books available for sale at the online store. If authorized, users can purchase the content/book or rights to read or work with the book.

Content can be managed and archived. Note-files that were taken on specific content can also be managed.

Each user client allows users to organize and conduct research via a built-in web browser.

Personal content can be shared between any number of authorized people. Two users can for example share one document, whereby both users are able to trace each others comments and input.

In order to initiate and use the present invention, a user must log into system 100, that is operate client 104 to log into server 102, and load content from server 102 for processing on the client/server system. These and other processes are described herein below.

Operation of the System: User Login

With reference to FIG. 2, one exemplary user login process is described.

1. The INETOO client application logic 226 sends a user login request to the gateway component 202 on the server system 102'.

2. The login request is forwarded to the application firewall component 208, which will then lookup the user in the authentication source. (Authentication sources can be connected via system authentication source provider plug-ins. The application firewall can load different 'Authentication Source Providers' like for example LDAP, Active Directory or a Provider for a relational or object relational Database.)

3. If the user exists in the authentication source, the application firewall 208 issues an access ticket or other authorizing token or permission, which is forwarded to the application server component 210. If the user does not exist, the client 104' is informed by the application firewall that the user has to register first. The client application 226 would then redirect the user to the system bookstore website or other appropriate system 100 website for registering.

4. The application server component 210 now requests information about the user from the content manager component 216.

5. The content manager component 216 loads authorization information and information about what content the user may access from the data store 224.

6. One request from the application server 210 can contain multiple queries. After the content manager component 216 has processed all queries (for example: 'which books are available to the user, what ranking/status has the user, whether there are offline messages for the user, what groups or communities the user belongs to, which other users are members of the users buddy list, which Users are online, which content are they currently browsing or working at, etc. . . . ) the information is sent back to the application server 210.

7. The application server component 210 sends the information back to the client via the application firewall 208 and the gateway component 202. The answer contains all information needed to initialize the client's user interface, for example: displaying the books available to the user, the users buddy list, the history of the last user actions, and the security ticket issued by the application firewall for further messages or requests to be identified.

Operation of the System: Load Content/Open Book

Again with exemplary reference to FIG. 2, a load content/open book process is described thusly, 1. The client application 226 requests the content by sending a request to the application server component 210 via the gateway 202 and the application firewall 208.

2. The application server 210 checks if the user is authorized to view the requested content (this information is already cached since the user has already logged in).

3. If the user is authorized to access the content, the application server 210 checks if the requested content is already cached in the cache manager by sending a request to the cache-manager component 214. If true; the information is loaded from the cache 214, if false; the information is requested from the content manager 216 component. Also action broadcasting is performed at this point of the process—see the description of user action broadcasting below. The content is stored in XML format (eXtensible mark-up language). This enables the application server component 210 to extract the content parts of interest quickly. Only the information of the page the user wants to view is prepared and then sent to the client application 226.

4. Based on the specific access rights, the content that has been requested and which the user is currently working with, is then sent back on demand to the client via the application firewall 208 and the gateway component 202.

It will now be understood that a user(s) is logged on to system 100 and content from within the system is available for all the varied usages as described herein.

Operation of the System: User Action Broadcasting

Figure 17:
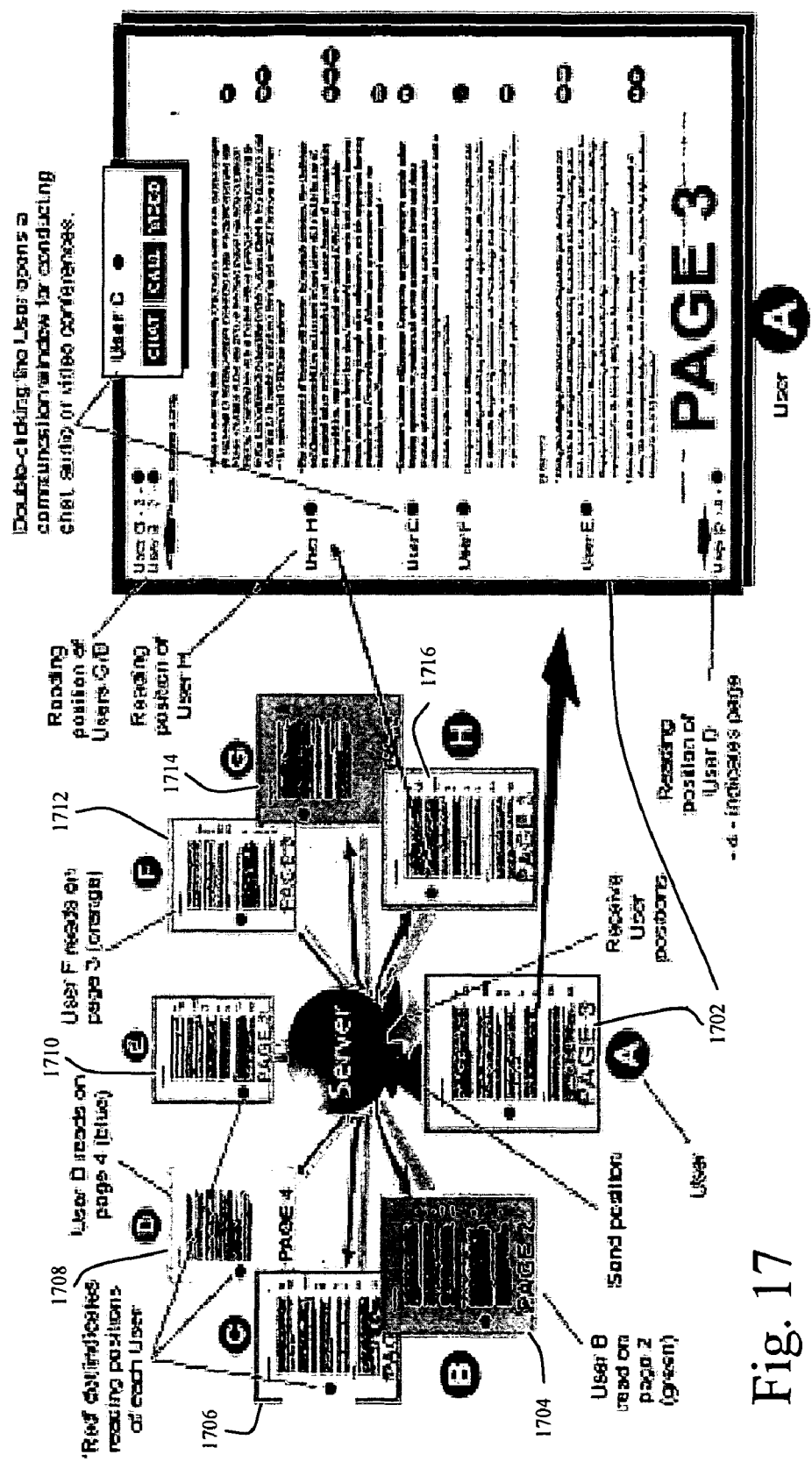
FIG. 17 is a diagrammatic view showing user action broadcasting in accordance with the present invention.

With reference to FIG. 17, user action broadcasting, a significant feature enabling significant advantages, allows an authorized user to view all other authorized users who are accessing the same electronic content (i.e. document, book etc.) along with their respective precise reading location and other information. When an authorized user performs a command, selects text, clicks on any text portion or icon within a page or layer, or scrolls, flips to certain pages etc., the position and/or activity is broadcast, processed and updated by the server 102 and then forwarded to all other authorized users. Authorized users can then see who is reading or performing other actions within the content and optionally decide whether or not to communicate with one or more other users. This method discourages users from contacting other users who may not have read sections of interest, while enabling users to identify and communicate with other users who are actively working on the same content that they are, thereby encouraging collegial communications while improving efficiency. The ability to obtain instant embedded information to clarify meaning and to get instant communication access to other users will minimize user's losing the critical context in the thought/learning process and make communication and learning more effective.

Generally with respect to FIG. 2 and the user action broadcasting:

1. If a user is browsing content or is selecting elements in the content, the client 104 sends a message to the application server 210 via the gateway 202 and the application firewall 208. The message contains information about what the user did. For example: user opened the book with the id <binary>, user selected text with 'from position' and 'to position'.

2. The application server component 210 will look up which other users have requested to see actions of this user. This request can be set implicitly or explicitly. For example, if a user belongs to a community and is browsing the same book on the same page, like another user of the same community, a request is set implicitly for both users. It is also checked if the user is authorized to know about this action information of other users based on authorization information and user status.

3. If there is the need to inform other users of the users action, the application server component 210 broadcasts the action to all clients, currently on the same page. This also happens if a user is for example requesting to open a book or is changing the page or if the user is requesting to add a new layer.

4. The client application 226 is now able to collect and display information about other users positions by placing the respective user action based broadcasting (UABB) icons next to the text that the other users last interacted with.

The user-action based broadcasting is visible in the source content, or in text-based notes and documents. As described above, icons appear whenever other users are online reading the same material, that is, multiple users are viewing the same content. Users positions are broadcasted periodically whenever a user clicks on an icon, points the curser to a specific location in the text, or performs a task such as selecting, or copying text or content, highlighting text or content, etc. In the case of inactivity, the software may calculate and broadcast for each user the centered reading position of the current page. In the case of activity, this user-position information is periodically updated and broadcast. Different icons (colors, that may include the name and/or title of the person beneath the icon, etc.) are used to signal different users and/or groups. This is also referred to more specifically herein as user location broadcasting.

With reference again to FIG. 17, the user action broadcasting capability is illustrated at a high level through the various activities of eight users 1702-1716 represented in each other's content page. User page 1702 is illustrated in enlarged format to show a representation of the other users' activities reflected in the page. Details of the user action broadcasting are described below.

Figure 18:
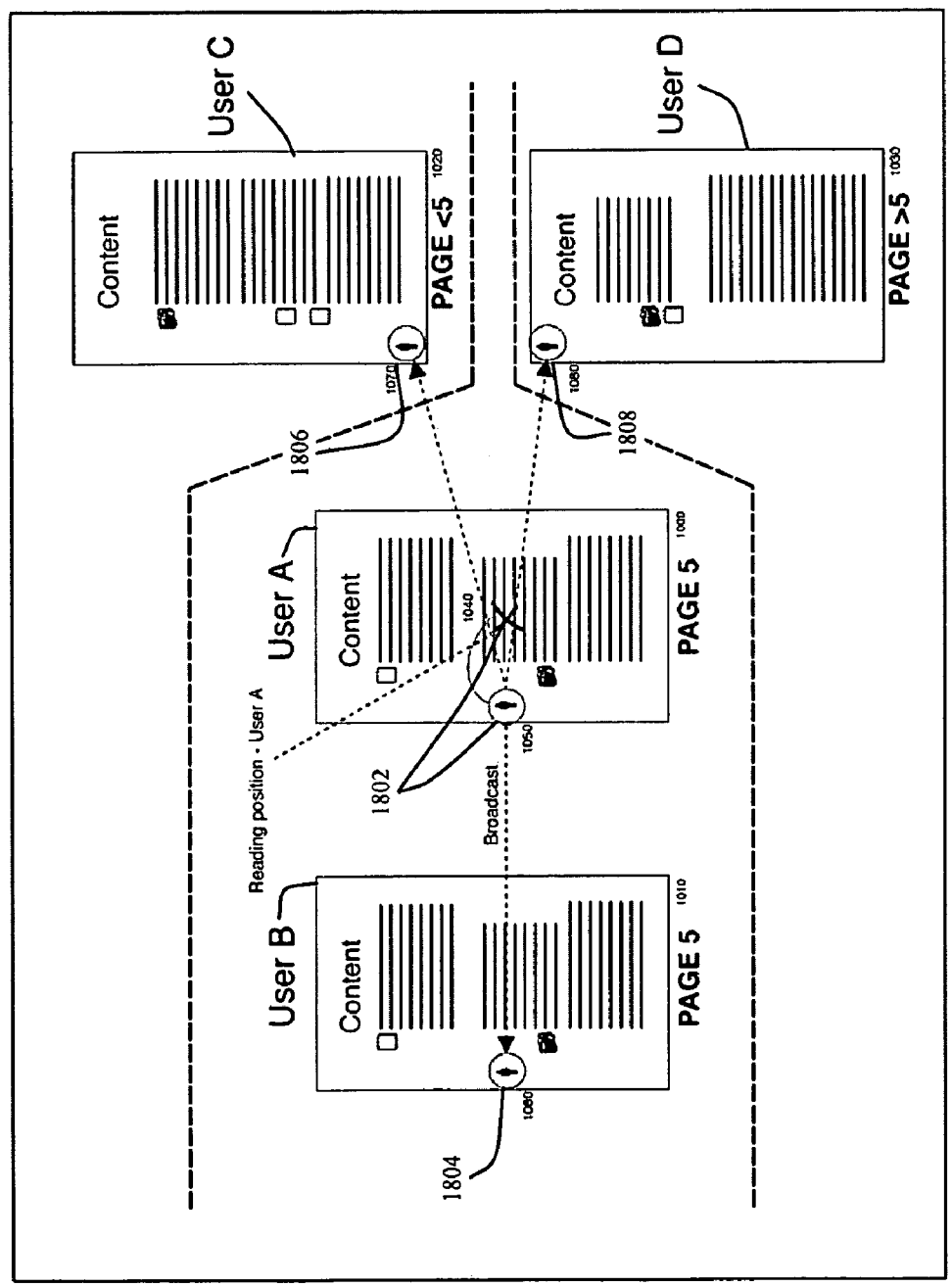
FIGS. 18, 19 and 20 are block diagrams illustrating a user-action based broadcasting process in accordance with the present invention.
Figure 19:
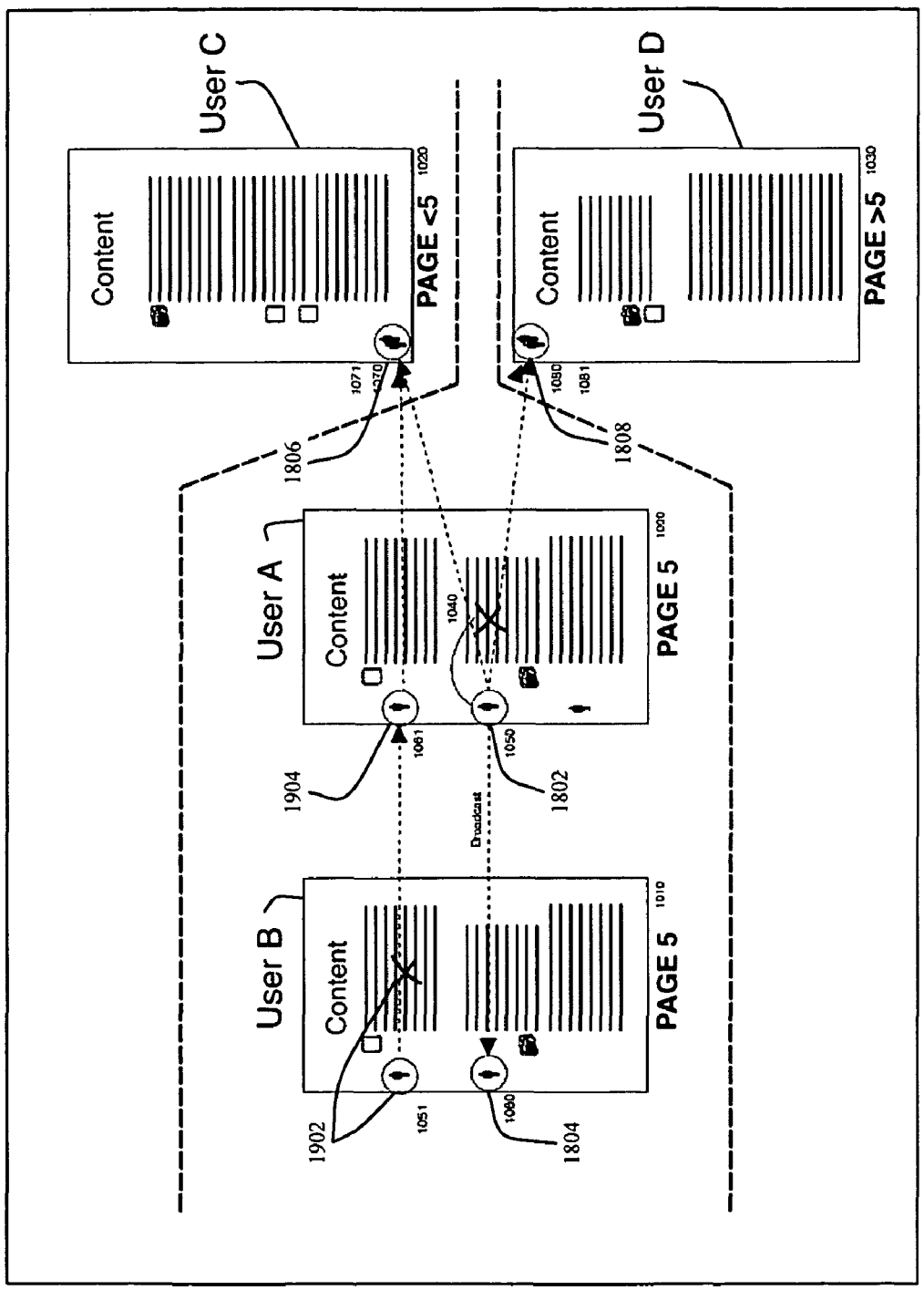
Figure 20:
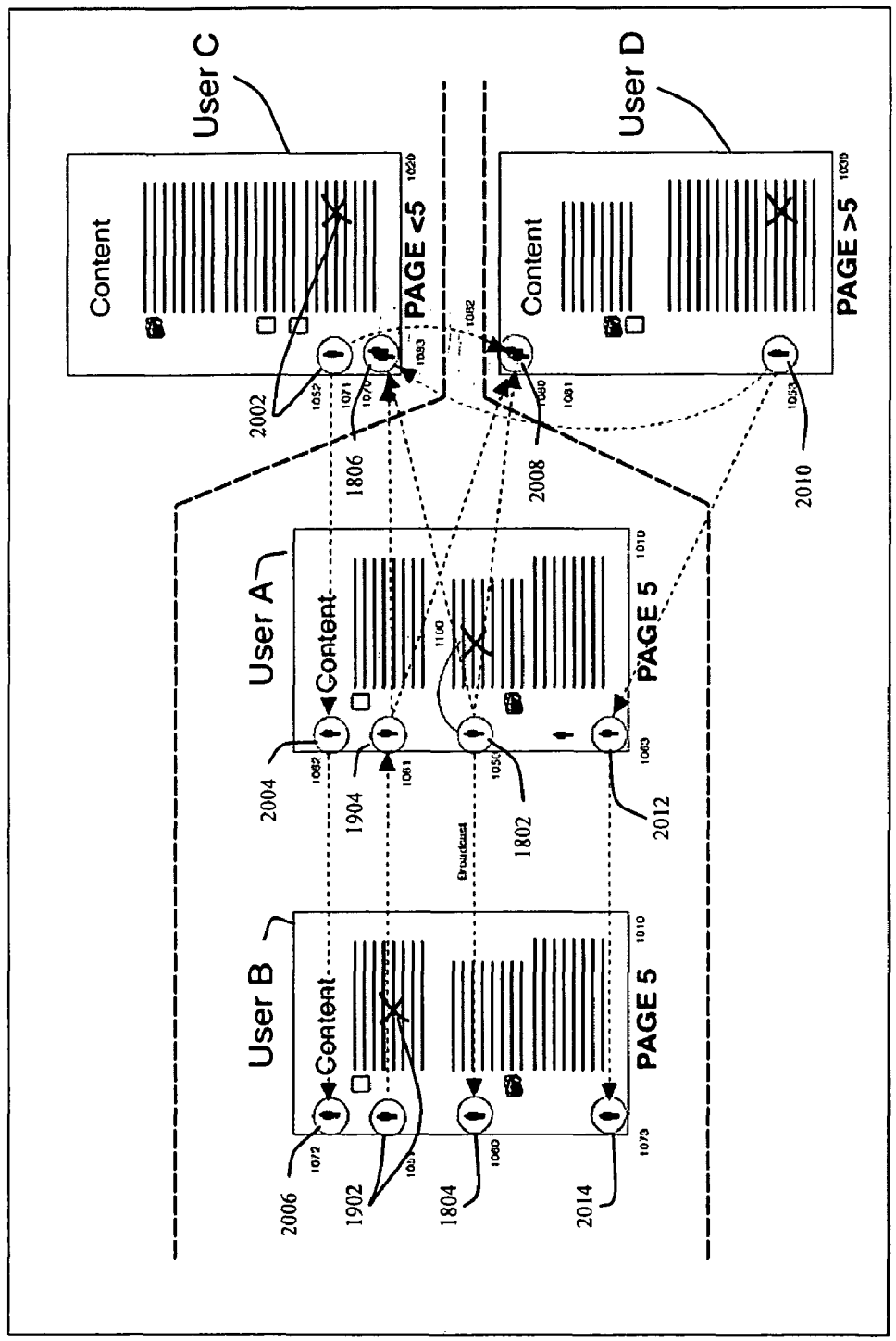

With reference now to FIGS. 18, 19, 20, further explanation of the user-action based broadcasting is given, with like elements between these Figures indicated by like reference numerals. Considering first FIG. 18, a user A is reading, for example, content on a page 5 of a textbook. The most recent position, indicated at 1802, is tracked by server system 102 and is broadcasted to a user B, a user C and a user D. Because user B is reading the same page 5, the icon of user A (a student) is placed at a position 1804, substantially the same position on the same page. This icon 1804 will remain at that position and will be periodically updated and moved to a new position as a new user A position is sensed by server 102. User C, in comparison, is reading a lower numbered page than page 5. The icon 1806 representing the reading position of user A to user C is therefore placed at the bottom of User C's content page, thereby indicating to user C that user A is reading ahead in the content and not on the same page. The system 100 is thus able to broadcast the specific page, chapter and or line number of each reader/user to give other reader/users a more clear understanding of where each are located within the content. This broadcasted position may be, for example, displayed within the icons or linked to the icons. User D, in comparison, is reading a page (or several pages) ahead of user A. Therefore, the position of user A 1808 as displayed to user D is shown at the top of the user D's content page.

While user A's position is broadcast to the other readers, the same broadcasting occurs with the other users' positions. With reference to FIG. 19, there is shown the reading position of user B 1902 that is broadcasted to user A and is displayed with the appropriate icon 1904. User C will receive the position of Users A and B 1806, again on the bottom of the page, the icon 1806 changing to display an indication, such as two figures within the icon, indicating that more than one user is reading ahead. It will be understood that each icon may include associated, more detailed information, for example: identities of other users, numbers of other users, exact page and line numbers of other users, indications of other user activities and actions, exact time information, and any other useful information which might iconically (including associated text and information) be displayed. Further, the system may be enabled such that moving a mouse pointer over and/or clicking on a reader icon provides additional information about the reader.

FIG. 20 completes the illustrated example of user broadcasting of all user positions. The position of user C 2002 is broadcast to user A 2004, User B 2006 and User D 2008. Similarly the position of user D 2010 is broadcast to User A 2012, User B 2014 and User C 2002.

It will be understood that, in addition to user action broadcasting, the present invention facilitates direct user communications. For example, using the VOIP function enabled by system 100, users may communicate directly by voice with each other while processing content in the various manners described herein. In addition, e-mail and instant messenger functions may similarly be provided by system 100 and/or one or more supporting systems, whereby users may communicate using e-mail or instant messaging.

Operation of the System: User Dynamic Note-Taking Process

Figure 21:
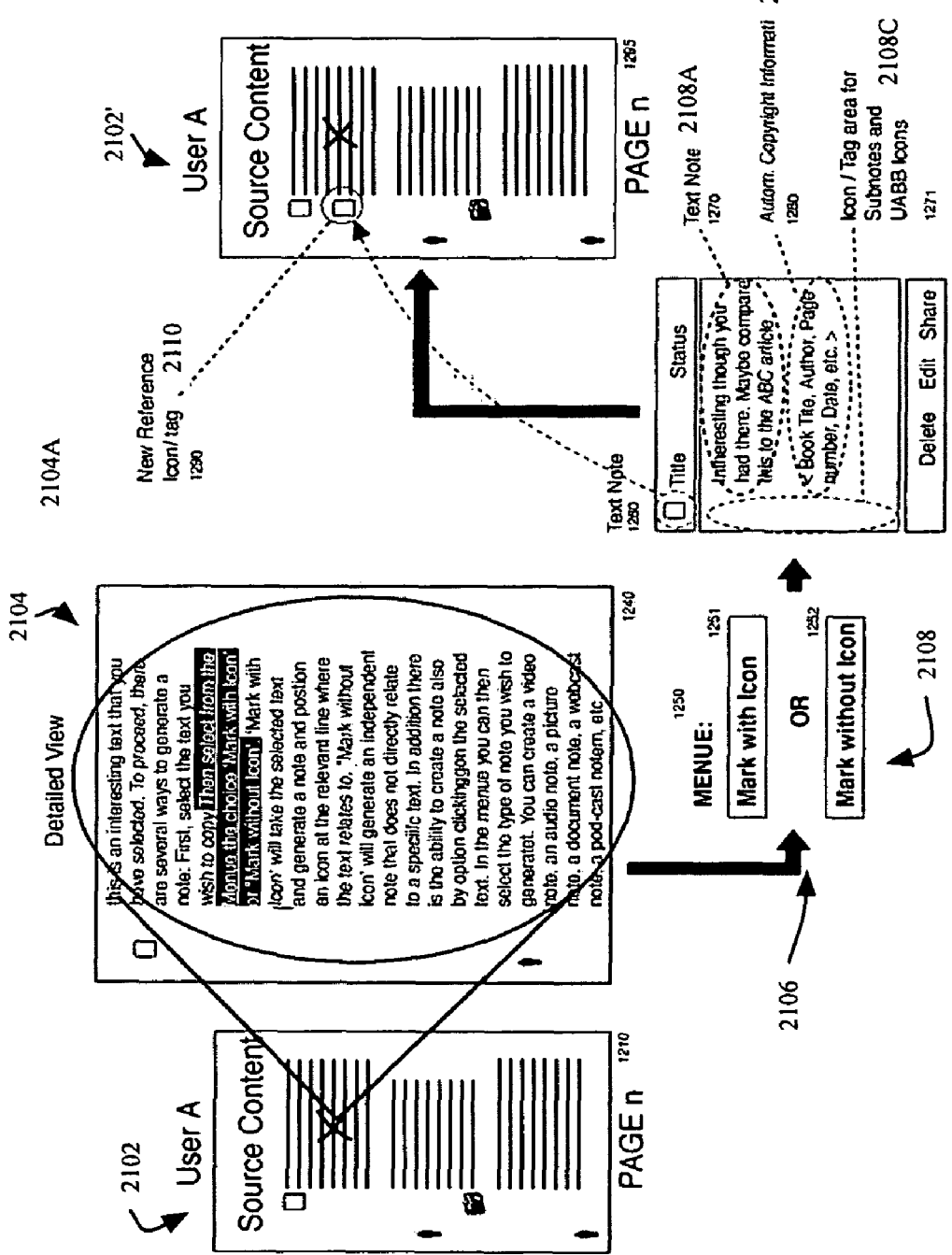
FIG. 21 is a diagrammatic view showing a process of creating dynamic notes within an electronic document.

Generally, dynamic note-taking allows users to attach notes to specific spots in documents, text and content. Notes can be generated in several ways. With reference to FIG. 21, an existing document 2102 is shown, a portion in detailed view at 2104. A user can select specific text 2104A and then select a command function 2106, either 'Mark with Icon' or 'Mark without Icon', for example by invoking a menu command menu. By selecting the 'Mark with Icon' command, a new note 2108 (in this example a text note) will be generated and the selected text will be automatically copied, together with or without all attached or selected information, from the source content into the note 2108A. In the described embodiment, the copyright information of the copied content may also be automatically transferred into the note 2108B and, for example, placed beneath the copied text. After the generation of new note 2108A a 'note' reference icon, or tag, will be generated and placed as a reference at the starting line in the originating document, shown as 2102' (primed) with the new tag 2110. Selecting the 'Mark without Icon' command from menu 2106 will copy the text without the icons to an independent note, an independent note comprising a note without any references, links or tags to specific source content. In the described embodiment of the invention, it is possible to mark and copy content that contains embedded links to other content. If this is done, the icons will be displayed with the marked text in the new independent note, however without a physical tag or link to the source content.

Clicking the icon 2110 in the original marked content 2102' will open in view the related note 2108A. Text notes can be of any length and Users can add their own text, pictures, and content etc. to the note(s). When double-clicking an icon within a note, or the copied text itself, the source document will automatically open to the page containing the copied content, highlighting the section in the source document that was copied including the relevant icon, and vice versa. It is also possible to create sub-notes, which constitute notes within a note, but are otherwise identical to the described note. Users can create unlimited sub-notes by repeating this process. In this case a reference icon/tag is placed in the icon/tag area for the respective sub-notes. Similarly, user action broadcasting icons can also be accessed and viewed within notes.

Figure 22:
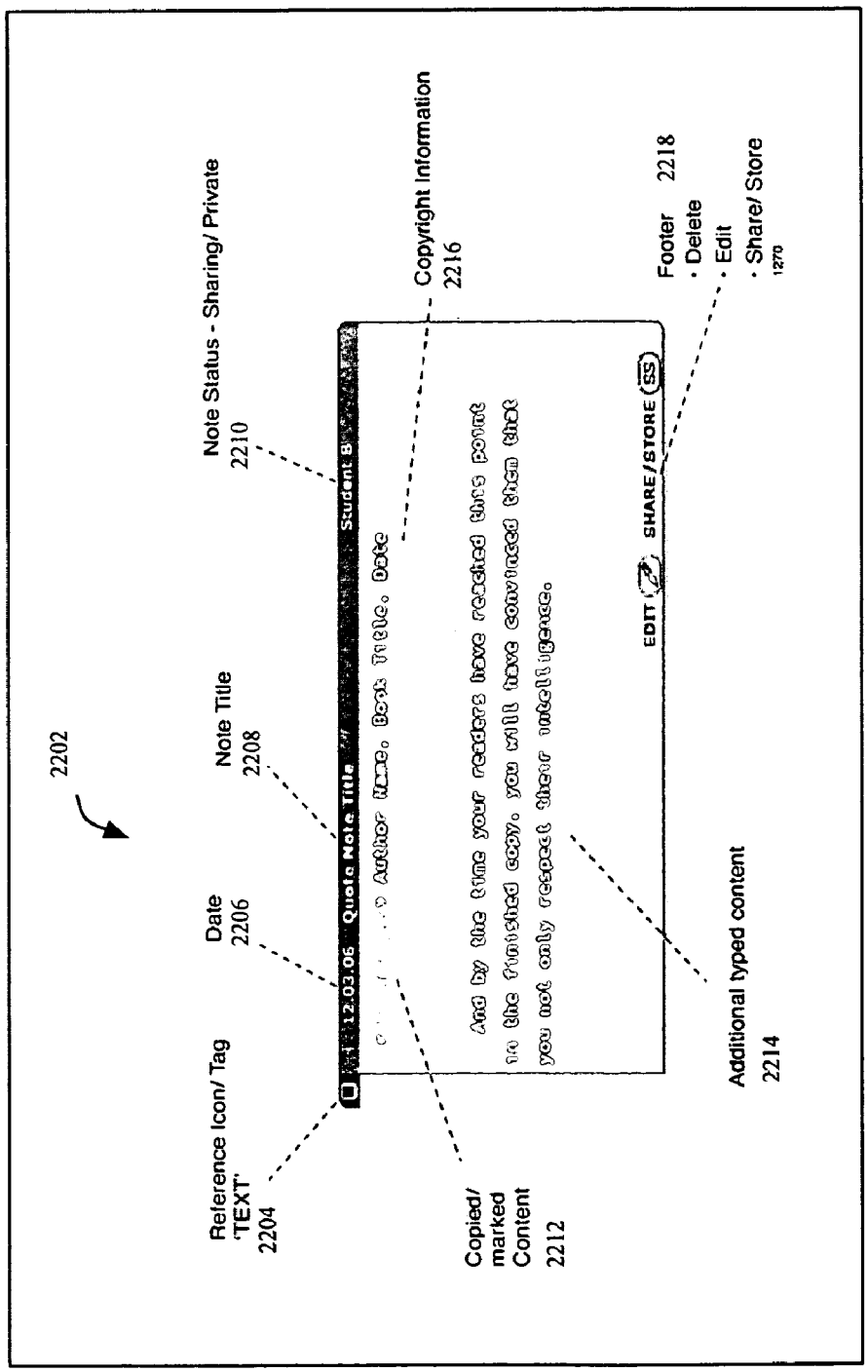
FIG. 22 is a diagrammatic view showing details of a dynamic note within an electronic document.

FIG. 22 shows an exemplary detailed view of a note, in this case a text-note 2202. All notes have a similar shell while their actual content is typically different. Different reference icons, or tags 2204 reveal the note type such as audio note, video note, case note, Web cast note, pod-cast note, etc. All notes contain note-information 2214. In this example copied content 2212 is only one word "disarmingly", the balance 2214 of the note having been typed. A date 2206 is place on top, which allows users to sort their notes by dates. A title 2208 will be automatically generated by default containing the first few words of the marked (copied) note-information. Users are able to modify the title manually, at any time, by simply typing over the title. A status information field 2210 displays the identity of the user who has created this note; if the note is a public note from another user it displays 'shared', if it is not a shared note it displays 'private'. In this illustrated case where the note was received from a fellow student, the status field 2210 indicates the name of the student (in this example student B).

When content is copied to a note the copyright information of the source content can automatically be transferred and displayed next to the copied text 2216. The copyright information will typically contain the book or document title, author, page and issue date and may contain other information such as version or publisher, or depending on the type of content also information such as producer, movie length etc. Users are also able to write their own text into the notes 2214. In the event that the text was already selected or marked and users want to avoid re-marking the text to copy it to a note, it is possible to invoke a menu and select 'copy,' and then pick either 'paste in new note' or 'paste in existing note' to copy the selected content.

Figure 23:
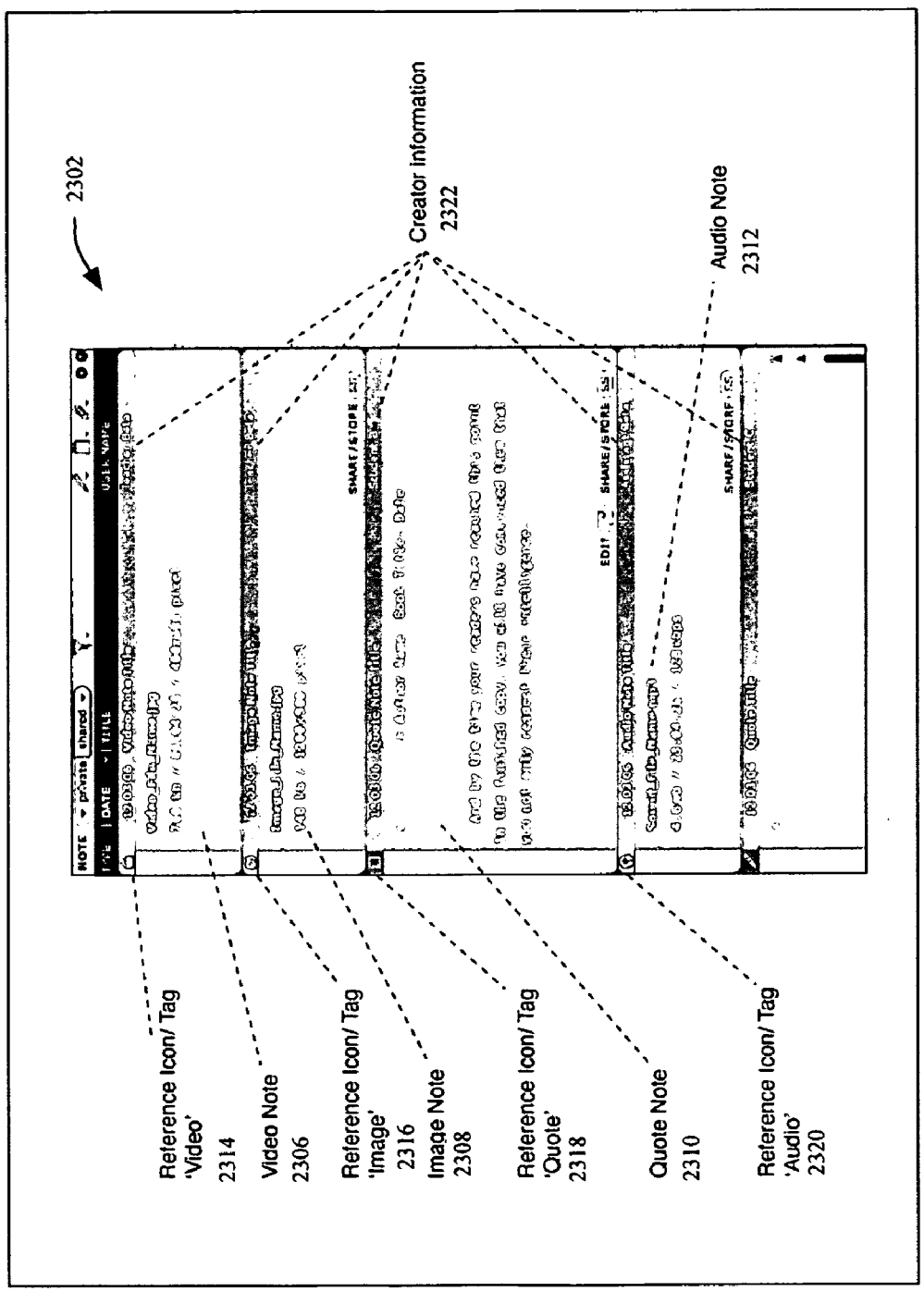
FIG. 23 is a diagrammatic view showing details of a stack of dynamic notes within an electronic document.

Notes are collected in the system 100. All content including all notes are stored in the server 102. However, it is possible for a user to additionally store content or notes locally, especially when it is desired that notes or documents be private. In this described embodiment of the invention, all notes are stored remotely on the system 100. Notes marked private are not made available to other users. It will be understood that the storage of all notes including private notes on the server reduces the server client traffic, provides persistent storage for the note content and facilitates operation of the system. In different embodiments, users may optionally choose the server for storing their private content or store private notes only locally. FIG. 23 shows a collection of several notes in a single column view 2302. In this example there are a video note 2306 with a video icon 2314 indicating the note type. Furthermore, there is an image note 2308, a quote note 2310 and an audio note 2312 all with their respective icons 2316, 2318 and 2320. In addition, each note contains information on who created the note 2322. If the shared note is active, the user can toggle between private notes and shared notes.

Figure 24:
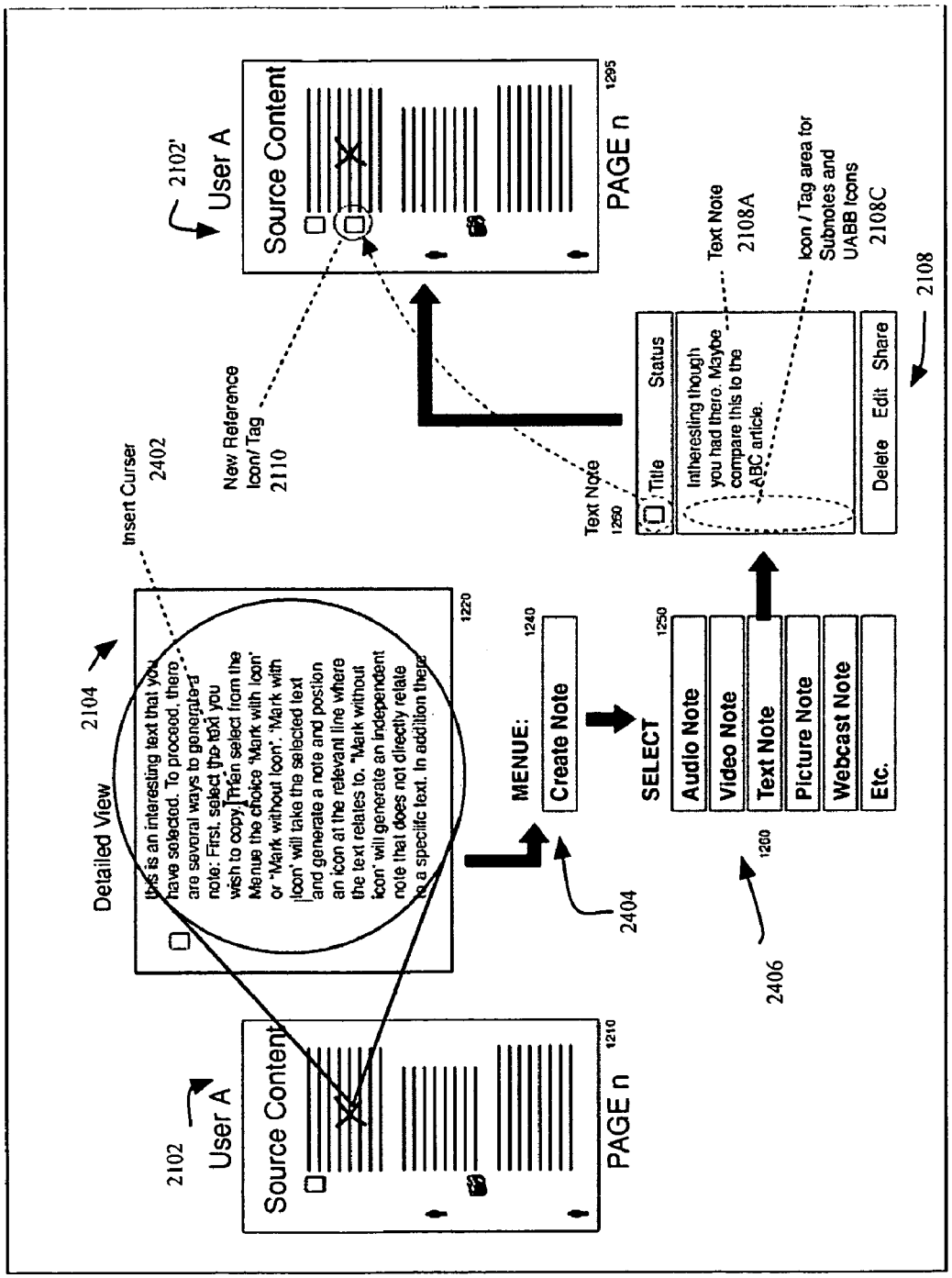
FIG. 24 is a diagrammatic view showing an alternate process of creating dynamic notes within an electronic document.

With reference now to FIG. 24, there is shown an alternate embodiment for creating notes, other than through marking text. Like elements to FIG. 21 are indicated by like reference numerals. In this example a curser is placed at a desired text position 2402 where the relevant note is to be placed. By invoking a menu 2404, for example with a mouse click or drop-down selection, a user can select 'Create Note' and then select the note type 2406 they want to create. In this example, the user selects a text note and immediately afterwards the note 2108 is created. The user can then type in their own text 2108A. Upon creating the note, the new reference icon or tag 2110 is placed in the note and at the source spot 2110 of the source content 2102' (indicated as primed to show the insertion of the icon). In addition, users can create sub-notes as described above, the reference icon being placed in the note reference area 2108C.

Figure 25:
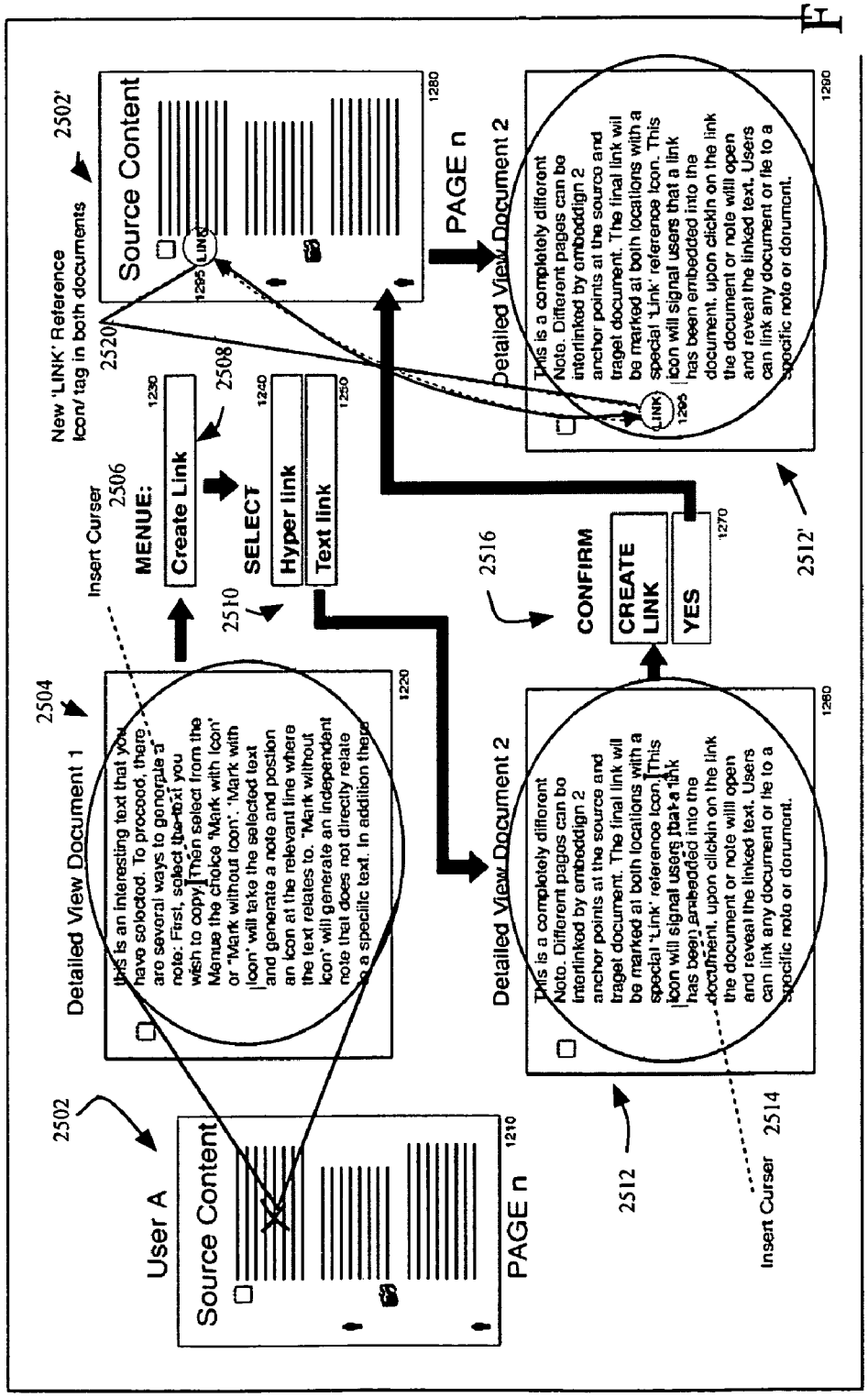
FIG. 25 is a diagrammatic view showing another alternate process of creating dynamic notes within an electronic document.

FIG. 25 describes another embodiment of note-taking, in this instance by dynamic linking. In this embodiment, the user inserts the cursor 2506 and selects desired text 2504 from within a document 2502, wherefrom the link will originate. Upon invoking a menu 2508 the user can select a menu selection 2510 of either 'Hyper Link' or 'Text Link' for setting the source link or target link. Selecting 'Hyper Link" will allow the user to affix a hyperlink to a Website into the marked up document. In this example, the user inserts a cursor 2514 to select a second document 2512 and places a target link 2520 into both the marked up source document 2502' and the marked up second document 2512'. Thus, selecting the hyperlink icon 2520 from the source 2502' will take the reader to linked content 2512, while selecting the icon 2520 in document 2512' will take the reader to source content 2502'.

Alternatively, the 'Text-Link' can be selected from menu 2510 and confirmed by selecting 'YES' from the menu 2516. A reference icon/tag 2520 is similarly placed in both documents on the same lines where the content is linked. The difference between a hyperlink and a text link is thus seen to be that the hyperlink refers to an external website (a URL) whereas the text link links to a specific text within documents or notes residing on system 100.

It will be understood that notes, like user location and other icon-represented inserts and mark-ups, are represented by icons that are broadcast to all other authorized users. User action-based broadcasting thus including user location broadcasting and user mark-up and note insertion and broadcasting.

Summary, Features and Advantages

The present invention provides a mutually beneficial hosting platform that caters to both authors and publishers for distributing content. The described platform allows authors/publishers to effectively publish existing digital XML content in a new, dynamic XML-based format and gives end-users (such as professors and students) the ability to easily customize and interpolate this new dynamic content into their curricula in order to suit their specific needs. Authors/publishers can import existing textbook XML-files and embed additional digital content such as videos or audio files, texts or whole documents, html links, etc., into dynamic, access-managed electronic layers, making the embedded content available to users on demand. The invention can in one sense be characterized as an application technology and service provider for publishers and authors, and in another sense as useful for libraries, corporate environment and software, search and technology firms, whereby the platform can be used to distribute digital content. Unlike other existing solutions known to the inventors, content owners such as publishers and authors will retain full control over the digital rights management as well as the marketing and sales process.

In yet another sense the invention provides a significant content review, study, markup, sharing and educational tool for users. Users can embed additional digital content into their personalized private "layers", thereby customizing content to their own preferred personal learning format and pace. Authors and publishers can leverage the incorporated feedback mechanism from the users to produce more valuable and targeted textbooks for their customers. The invention thus leverages the three major drivers in education: publishing, Internet technology and learning, whereby the key element of teaching/instruction is built into the platform.

Using the present invention, students and professors will have, believed by the inventors to be for the first time, a solution that offers a complete, dynamic learning workflow solution, ranging from purchasing and distributing dynamic content to working with and reading content. The dynamic content (smart content) is integrated into the workflow and is a powerful tool for the users. This level of integration, with the ancillary materials so tightly tied to the original work itself, creates a very "sticky relationship". Consequently, the inventive solution itself turns out to be valuable to users, becoming a powerful assistant in their research/learning/reading processes; and therefore the platform is very well suited for other applications (online service manuals, R&D documentation etc.). Unlike existing static document readers, which are designed for delivering printed content as an output, the present invention is optimized to display dynamic content in a special, easy-to-read format on screens.

Another feature and advantage of the present invention is that it enables students to communicate with peers in real-time format regarding mutually studied content. As the classroom atmosphere is critical for the student's performance, there is incorporated into the invention a real-time communication functionality so that professors and students will not only know who is currently online but also the specific section locations of any person reading the available content, making interactive discussions within the context of content study possible for the first time. In addition, the note-taking feature is simple, intuitive, and secure as the copyright information and digital rights management can be handled automatically by the platform allowing students to take notes in any form and dynamically link those notes with the reading material. These features, among others, will foster the growth of a unique learning community for professors and students while also offering targeted advertising and cross-selling opportunities for publishers. As described above, the present invention integrates at least three types of content, traditional textbook, customized content and the less noticed but equally important "interactive and spontaneous content," into a single dynamic learning workflow product that follows each student's unique individual knowledge base, learning process and learning pace.

The present invention can be implemented using a flexible and scalable technical framework for supporting open standards and open application interfaces. It is affordable to implement and operate. All functions appear on the described system as a set of separate components that are joined and choreographed to create composite applications and processes. The present invention can be integrated with existing databases or back-end systems.

There has thus been shown and described new and improved methods and systems for facilitating the publication, sharing, editing and mark up of electronic content such as educational textbooks. The invention includes numerous features, such as layering, iconic mark-up, user notes and comments, user communication and user action sharing. The invention provides significant advantages with respect to electronically shared information, including but not limited to: a relatively simple, straightforward system which writers and content owners may used to publish their content, the ability for various parties to mark-up and otherwise annotate electronic content, and the ability for various parties to communicate with respect to and share annotated electronic content, both in real time and non-real time environments. The present invention has application in the field of electronic content publishing and management. It has particular application in the fields of electronic books, documents, manuals and electronic educational textbook publishing and management in various fields of education, research and development.

The present invention has been shown and described with respect to exemplary embodiments. The reader will understand that the invention is not thus limited. Numerous changes, modifications and improvements will now occur to the reader within the scope of the invention.

What is claimed is:

1. A method for managing electronic content, including:
receiving primary and layered content at a client device, each item of layered content associated with a particular paragraph or a portion thereof in the primary content;
enabling each of a plurality of users to view a particular paragraph or a portion thereof in the primary content, and any layered content associated with that particular paragraph or a portion thereof in the primary content; and
displaying to each of the plurality of users at least one indicator in juxtaposition with the particular paragraph or portion thereof in the primary content viewed by another one of the plurality of users;
updating the position of each displayed indicator as each one of the plurality of users views a new paragraph or portion thereof;
receiving a request from a first user of the plurality of users to communicate with a second user of the plurality of users by selecting the indicator displayed in juxtaposition with the particular paragraph or portion thereof in the primary content viewed by the second user; and
enabling the exchange of information between the first user and the second user.

2. The method of claim 1 wherein the step of displaying includes:
associating, with each of the plurality of users, a distinctive icon; and
displaying the particular paragraph or a portion thereof in the primary content viewed by each of the plurality of users using the distinctive icons.

3. The method of claim 1 and further including the steps of:
receiving a modification to the layered content from at least one of the plurality of users, the modification associated with a particular paragraph or a portion thereof in the primary content and accessible by at least one other user.

4. The method of claim 3 wherein the modification includes a link to further content, the link selectable to display the further content.

5. The method of claim 3 and further comprising:
establishing a plurality of user groups, each of the user groups including a subset of the plurality of users; and
authorizing the users in each of the user groups to view only the positions and modifications of other users in the same group.

6. The method of claim 4 wherein the further content is selected from the group comprising text, graphics, audio and video.

7. The method of claim 4 wherein the link includes an icon indicating the type of the further content.

8. The method of claim 5 wherein the plurality of users belong to the same group.

9. The method of claim 6 wherein the further content comprises a note prepared by a user.

10. A method for managing electronic content, including:
receiving electronic primary content;
identifying a plurality of users;
authorizing each of the plurality of users to view the electronic primary content;
authorizing each of the plurality of users to add layered content to the electronic primary content;
authorizing each of the plurality of users to view the layered content and the electronic primary content;
authorizing each of the plurality of users to view at least one indicator in juxtaposition with the particular paragraph or portion thereof in the primary content viewed by another one of the plurality of users;

updating the position of each displayed indicator as each one of the plurality of users views a new paragraph or portion thereof;

receiving a request from a first user of the plurality of users to communicate with a second user of the plurality of users by selecting the indicator displayed in juxtaposition with the particular paragraph or portion thereof in the primary content viewed by the second user; and enabling the exchange of information between the first user and the second user, whereby each item of layered content is associated with a particular paragraph or portion thereof in the primary content.

11. The method of claim 10 and further comprising:

establishing a plurality of user groups, each of the user groups including a subset of the plurality of users; and authorizing the users in each of the user groups to view only the positions and modifications of other users in the same group.

12. The method of claim 10 wherein the layered content includes a link to further content, the link selectable to display the further content.

13. The method of claim 12 wherein the further content is selected from the group comprising text, graphics, audio and video.

14. The method of claim 13 wherein the further content comprises a note prepared by a user.

15. The method of claim 14 wherein the link includes an icon indicating the type of the further content.

16. A system for managing electronic content, including:

a server computer for storing primary and layered content and for communicating with a plurality of client computers, each client device including software operable by a user for downloading and processing the primary and layered content, the server computer comprising:

an authorization system for controlling the access of each of the plurality of client devices to the primary and layered content;

a user action broadcasting system for enabling each of the client devices to add layered content associated with a particular paragraph or a portion thereof in the primary content and for enabling each of the plurality of client devices to display the layered content associated with a particular paragraph or a portion thereof in the primary content;

a user location broadcasting system for enabling each of the client devices to display at least one indicator in juxtaposition with the particular paragraph or portion thereof in the primary content displayed by another one of the plurality of other client devices displaying the primary content; and a user communication system receiving a request from a first client device to communicate with a second client device by selecting an indicator displayed in juxtaposition with the particular paragraph or portion thereof displayed by the second client device and enabling the exchange of information between the first client device and the second client device, wherein the user location broadcasting system updates the at least one displayed indicator as each of the plurality of client devices displays a new paragraph or portion thereof.

17. A method for dynamically sharing published electronic content amongst a plurality of users, comprising:

identifying a main, a second, and a third group of electronic contents;

authorizing a plurality of users to access the main group of electronic content;

authorizing at least a first group of the plurality of users to access the main group of electronic content and the second group of electronic content; and authorizing at least a second group of the plurality of users to access the main group of electronic content and the third group of electronic content;

displaying to each of the plurality of users at least one indicator in juxtaposition with the particular paragraph or portion thereof in the main group of electronic content viewed by another one of the plurality of other users;

updating the position of each displayed indicator as each one of the plurality of users views a new paragraph or portion thereof;

receiving a request from a first user of the plurality of users to communicate with a second user of the plurality of users by selecting the indicator displayed in juxtaposition with the particular paragraph or portion thereof in the primary content viewed by the second user; and enabling the exchange of information between the first user and the second user, whereby the second and third group of electronic contents are layered content, the main group is primary content, and each item of layered content is associated with a particular position in the primary content.

18. A method in accordance with claim 17 and further comprising:

authorizing each of the users to add layered content to the primary content; and authorizing each of the plurality of users to view the added layered content.

* * * * *